United States Patent
Fujishima et al.

(10) Patent No.: US 9,203,848 B2
(45) Date of Patent: Dec. 1, 2015

(54) METHOD FOR DETECTING UNAUTHORIZED ACCESS AND NETWORK MONITORING APPARATUS

(71) Applicant: FUJITSU LIMITED, Kawasaki (JP)

(72) Inventors: Yuki Fujishima, Yokohama (JP); Masanobu Morinaga, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 50 days.

(21) Appl. No.: 14/015,439

(22) Filed: Aug. 30, 2013

(65) Prior Publication Data
US 2014/0115663 A1 Apr. 24, 2014

(30) Foreign Application Priority Data

Oct. 22, 2012 (JP) ................................. 2012-233190

(51) Int. Cl.
*H04L 29/06* (2006.01)
(52) U.S. Cl.
CPC .................................. *H04L 63/1408* (2013.01)
(58) Field of Classification Search
CPC ...... H04L 63/1408; H04L 29/00; H04L 29/06
USPC ....................................................... 726/3, 23
See application file for complete search history.

(56) References Cited

U.S. PATENT DOCUMENTS

| | | | | |
|---|---|---|---|---|
| 5,510,777 | A * | 4/1996 | Pilc et al. ...................... | 340/5.27 |
| 6,584,069 | B1 * | 6/2003 | Kagemoto ............. | H04L 29/06 348/E5.005 |
| 7,386,525 | B2 * | 6/2008 | Nurmela ............. | H04L 63/0227 706/47 |
| 7,889,741 | B1 * | 2/2011 | Panwar ................... | H04L 49/30 370/392 |
| 2003/0120622 | A1 * | 6/2003 | Nurmela ............. | H04L 63/0263 706/47 |
| 2005/0091513 | A1 * | 4/2005 | Mitomo et al. ................ | 713/188 |

(Continued)

FOREIGN PATENT DOCUMENTS

| | | |
|---|---|---|
| JP | 2003-531430 | 10/2003 |
| WO | WO 01/80480 A1 | 10/2001 |

OTHER PUBLICATIONS

Paxson, Vern, "Bro: A System for Detecting Network Intruders in Real-Time", Proceedings of the 7th USENIX Security Symposium, Jan. 26-29, 1998, cover page and pp. 1-21.

(Continued)

*Primary Examiner* — Joseph P Hirl
*Assistant Examiner* — J. Brant Murphy
(74) *Attorney, Agent, or Firm* — Staas & Halsey LLP

(57) ABSTRACT

A method for detecting unauthorized access is executed by a network monitoring apparatus connected to a network in which packets are transmitted between a plurality of information processing apparatuses. The method includes obtaining, by the network monitoring apparatus, packets regarding at least one access performed from a first information processing apparatus to a second information processing apparatus. The method includes selecting at least one condition from among predefined at least two conditions. The selection is performed according to a combination between the first information processing apparatus as an access source and the second information processing apparatus as an access destination. The method includes determining whether each of the obtained packets satisfies the selected at least one condition. The method includes determining a possibility that unauthorized access has been performed on the second information processing apparatus, based on a number of conditions determined to be satisfied.

8 Claims, 15 Drawing Sheets

(56) References Cited

U.S. PATENT DOCUMENTS

| | | | |
|---|---|---|---|
| 2005/0198519 A1* | 9/2005 | Tamura et al. | 713/188 |
| 2005/0273607 A1* | 12/2005 | Yamana et al. | 713/168 |
| 2006/0005044 A1* | 1/2006 | Uchikawa | H04L 63/0428 713/189 |
| 2006/0059154 A1* | 3/2006 | Raab | 707/9 |
| 2006/0089987 A1* | 4/2006 | Igarashi | H04L 29/12783 709/225 |
| 2006/0259968 A1* | 11/2006 | Nakakoji et al. | 726/22 |
| 2006/0259970 A1* | 11/2006 | Sheymov et al. | 726/23 |
| 2007/0067839 A1* | 3/2007 | Hamada et al. | 726/22 |
| 2007/0101428 A1* | 5/2007 | Hamada | 726/23 |
| 2008/0084820 A1* | 4/2008 | Aoki et al. | 370/231 |
| 2008/0209547 A1* | 8/2008 | Funahashi et al. | 726/20 |
| 2009/0043889 A1* | 2/2009 | Gobara | H04L 29/12509 709/225 |
| 2010/0050256 A1* | 2/2010 | Knapp et al. | 726/22 |
| 2010/0132040 A1* | 5/2010 | Bhagwat et al. | 726/23 |
| 2010/0241744 A1* | 9/2010 | Fujiwara | 709/224 |
| 2010/0242084 A1* | 9/2010 | Keeni | 726/1 |
| 2010/0251329 A1* | 9/2010 | Wei | 726/1 |
| 2011/0030056 A1* | 2/2011 | Tokunaga | 726/23 |
| 2013/0167219 A1* | 6/2013 | Jung et al. | 726/13 |

OTHER PUBLICATIONS

Roesch, Martin, "Snort-Lightweight Intrusion Detection for Networks", Proceedings of LISA '99: 13th Systems Administration Conference, Nov. 7-12, 1999, cover page and pp. 229-238.

Wang, Helen J. et al., "Shield: Vulnerability-Driven Network Filters for Preventing Known Vulnerability Exploits", Proceedings of ACM SIGCOMM '04 Conference, Aug. 30-Sep. 3, 2004, pp. 1-12.

Yen, Ting-Fang et al., "Traffic Aggregation for Malware Detection", Proceedings of the 5th Conference on Detection of Intrusions and Malware & Vulnerability Assessment, Jul. 10-11, 2008, pp. 207-227.

* cited by examiner

FIG. 10

| AUTHENTICATION APPARATUS | ATTRIBUTE_1 (ACCESS APPARATUS) | ATTRIBUTE_2 (ACCESS APPARATUS) |
|---|---|---|
| S1: 192.168.0.11 | C1: 192.168.0.21 | DOMAIN_A |
| S1: 192.168.0.11 | C2: 192.168.0.22 | DOMAIN_A |
| S3: 192.168.0.13 | C3: 192.168.0.23 | DOMAIN_B |
| S3: 192.168.0.13 | C4: 192.168.0.24 | DOMAIN_B |

FIG. 11

| AUTHENTICATION APPARATUS | S1 | | S2 | S3 | | S4 |
|---|---|---|---|---|---|---|
| ATTRIBUTE_1 (ACCESS APPARATUS) | C1,C2 | OTHERS | ALL | C3,C4 | OTHERS | ALL |
| ATTRIBUTE_2 (DOMAIN NAME) | DOMAIN_A | OTHERS | ALL | DOMAIN_B | OTHERS | ALL |
| CONDITION_1 (AUTHENTICATION REQUEST) | NORMAL | NORMAL | ABNORMAL | NORMAL | NORMAL | ABNORMAL |
| CONDITION_2 (ONE AUTHENTICATION FAILURE) | — | ABNORMAL | — | — | ABNORMAL | — |
| CONDITION_3 (N OR MORE AUTHENTICATION FAILURES) | ABNORMAL | — | — | ABNORMAL | — | — |
| CONDITION_4 (CHANGE IN USER NAME) | ABNORMAL | ABNORMAL | — | ABNORMAL | — | — |

FIG. 12

| AUTHENTICATION APPARATUS | ACCESS APPARATUS | DOMAIN NAME | DETAILS OF DETECTION OF ABNORMALITY | WARNING LEVEL |
|---|---|---|---|---|
| S1 | C1 | A | CONDITION 3: X TIMES<br>CONDITION 4: Y TIMES | HIGH |
| S3 | C3 | B | CONDITION 3: Z TIMES | MEDIUM |

METHOD FOR DETECTING UNAUTHORIZED ACCESS AND NETWORK MONITORING APPARATUS

CROSS-REFERENCE TO RELATED APPLICATION

This application is based upon and claims the benefit of priority of the prior Japanese Patent Application No. 2012-233190, filed on Oct. 22, 2012, the entire contents of which are incorporated herein by reference.

FIELD

The embodiments discussed herein are related to a method for detecting unauthorized access and a network monitoring apparatus.

BACKGROUND

Currently, information is usually managed using information processing apparatuses, and important information such as personal information and classified information is often stored in the information processing apparatuses. As a result, targeted attacks for stealing important information from information processing apparatuses used by particular individuals and organizations are occurring. In the targeted attacks, malicious programs called "malware" are often used.

For example, an attacker transmits a malicious program to a target organization using an electronic mail or the like in order to infect an information processing apparatus used by the target organization with the malicious program. The information processing apparatus infected with the malicious program might transmit important information stored therein to an information processing apparatus controlled by the attacker. In another case, the attacker uses the information processing apparatus infected with the malicious program as a steppingstone and transmits a malicious program to another information processing apparatus belonging to the same network or collects important information from another information processing apparatus.

On the other hand, information security systems that enable detection of attacks made by malicious programs are being studied. The information security systems include an intrusion detection system (IDS), an intrusion prevention system (IPS), and a firewall. In a network-type information security system that monitors packets flowing through a network, the following methods have been proposed as methods for detecting an attack made by a malicious program.

For example, a method for detecting an attack in real time by converting a network traffic stream into an event at a higher level and processing the event in accordance with a predetermined security policy has been proposed. In addition, a method for detecting malicious traffic and warning a system administrator by matching predefined patterns of malicious traffic and current network traffic has been proposed. In addition, a method for detecting traffic that makes an attack utilizing known vulnerability of application software in a network and filtering out the detected traffic has been proposed.

In addition, a method for detecting an aggregate of communication on the basis of the similarity of communication performed by a plurality of computers and determining computers that might have been infected with malware on the basis of the detected aggregate has been proposed. In the detection of the aggregate, software installed on the computers performing communication, the content of communication, and external networks to which the other ends of communication belong are taken into consideration.

V. Paxson, "Bro: A System for Detecting Network Intruders in Real-Time", Proc. of the 7th USENIX Security Symposium, 1998, M. Roesch, "Snort-Lightweight Intrusion Detection for Networks", Proc. of the 13th Systems Administration Conference, pp. 229-238, 1999, H. Wang, C. Guo, D. Simon, and A. Zugenmaier, "Shield: Vulnerability-Driven Network Filters for Preventing Known Vulnerability Exploits", Proc. of ACM SIGCOMM '04 Conference, 2004, and T. Yen and M. Reiter, "Traffic Aggregation for Malware Detection", Proc. of the 5th Conference on Detection of Intrusions and Malware & Vulnerability Assessment, pp. 207-227, 2008 disclose related techniques.

During an attack made by a malicious program, a certain information processing apparatus (for example, an information processing apparatus infected with the malicious program first) might scan other information processing apparatuses belonging to the same network in order to search for an information processing apparatus to be infected next. For example, the certain information processing apparatus may access another information processing apparatus and determine whether or not unauthorized intrusion utilizing known vulnerability is possible on the basis of information included in a response. Alternatively, for example, the certain information processing apparatus may transmit an authentication request including stolen login information and search for another information processing apparatus with which login is possible using the login information.

Unauthorized access for realizing unauthorized intrusion into an information processing apparatus is preferably detected by an information security system. It is not easy, however, to accurately determine whether or not access from a certain information processing apparatus to another information processing apparatus is unauthorized access.

For example, even in the case of normal access other than unauthorized access, a login operation might be frequently performed depending on an information processing apparatus to be accessed (for example, when the information processing apparatus to be accessed is a file server that performs authentication). In addition, even in the case of normal access, authentication fails when, for example, a user has transmitted incorrect login information by mistake. On the other hand, in the case of unauthorized access, an information processing apparatus that permits guest authentication (anonymous access) might determine that authentication is successful even for an authentication request including incorrect login information.

Therefore, when only one fixed condition has been set for the number of accesses, the number of authentication failures, or the like and it is determined that unauthorized access has been performed if access satisfies the condition or it is determined that unauthorized access has not been performed if access does not satisfy the condition, erroneous detection and lack of detection of unauthorized access might occur. In this case, it is difficult to effectively use information provided by the information security system.

SUMMARY

According to an aspect of the present invention, provided is a method for detecting unauthorized access. The method is executed by a network monitoring apparatus connected to a network in which packets are transmitted between a plurality of information processing apparatuses. The method includes obtaining, by the network monitoring apparatus, packets regarding at least one access performed from a first information processing apparatus to a second information processing apparatus. The method includes selecting at least one condition from among predefined at least two conditions. The selection is performed according to a combination between the first information processing apparatus as an access source and the second information processing apparatus as an access destination. The method includes determining whether each of the obtained packets satisfies the selected at least one condition. The method includes determining a possibility that unauthorized access has been performed on the second information processing apparatus, based on a number of conditions determined to be satisfied among the predefined at least two conditions.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating an example of an authentication permission list according to a second embodiment;

FIG. 11 is a diagram illustrating an example of a behavior table according to a second embodiment;

FIG. 12 is a diagram illustrating an example of warning data according to a second embodiment;

DESCRIPTION OF EMBODIMENTS

The embodiments will be described hereinafter with reference to the drawings.

First Embodiment

Figure 1:
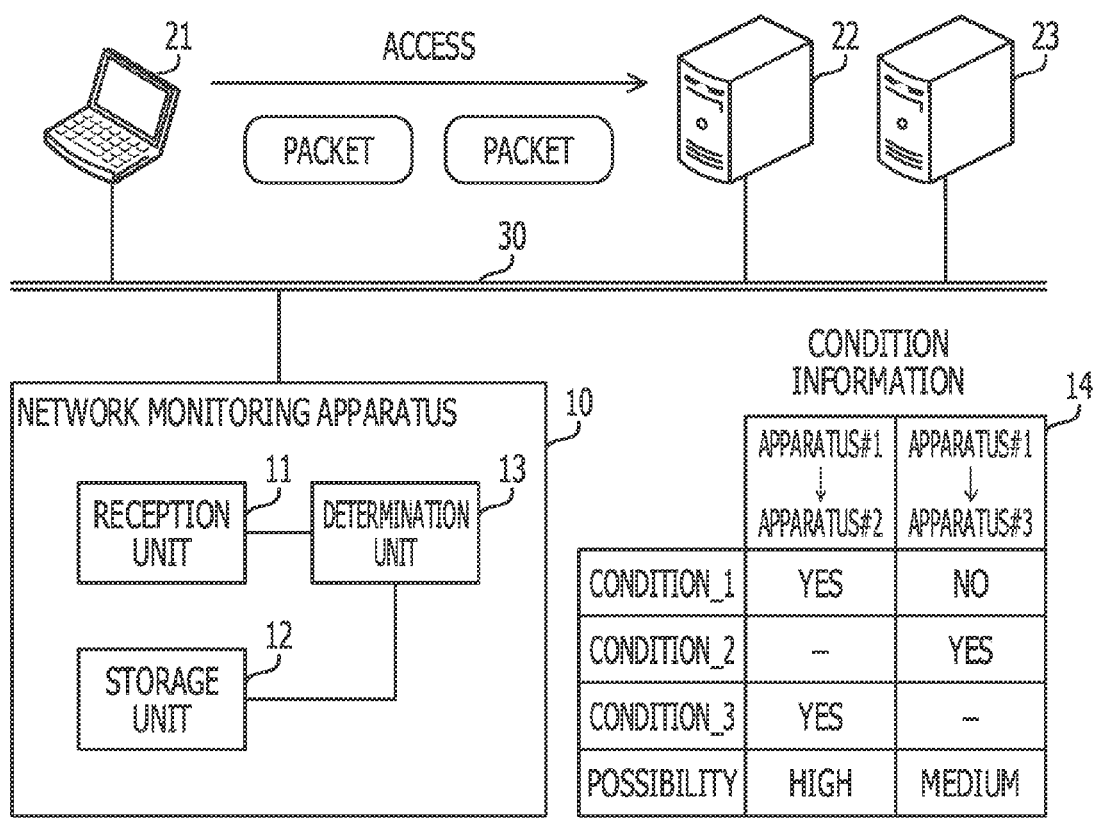
FIG. 1 is a diagram illustrating an example of an information processing system according to a first embodiment.

FIG. 1 is a diagram illustrating an example of an information processing system according to a first embodiment.

The information processing system according to the first embodiment includes a network monitoring apparatus 10 and a plurality of information processing apparatuses including information processing apparatuses 21 to 23. The network monitoring apparatus 10 and the plurality of information processing apparatuses are connected to a network 30.

The plurality of information processing apparatuses transmit packets through the network 30. In the transmission of packets, for example, the Internet protocol (IP) is used as a protocol in the network layer and the transmission control protocol (TCP) is used as a protocol in the transport layer. The information processing apparatuses may be client apparatuses as terminal apparatuses operated by users, or may be server apparatuses accessed from client apparatuses. For example, the information processing apparatus 21 is a client apparatus, and the information processing apparatuses 22 and 23 are server apparatuses.

The plurality of information processing apparatuses might be infected with malicious programs (may be referred to as malware) used for targeted attacks. A malicious program is, for example, transmitted to one of the information processing apparatuses belonging to the network 30 from an information processing apparatus used by an attacker, which is located outside the network 30 through a wide-area network such as the Internet.

In the first embodiment, it is assumed that the information processing apparatus 21 is first infected with a malicious program, and the information processing apparatus 21 scans other information processing apparatuses in the same network in order to search for an information processing apparatus to be infected next. During this process, the information processing apparatus 21 might access the information processing apparatuses 22 and 23. When the information processing apparatus 21 accesses a certain information processing apparatus, for example, the information processing apparatus 21 transmits a packet regarding an authentication request to the certain information processing apparatus. In addition, for example, the certain information processing apparatus transmits a packet regarding an authentication response corresponding to the authentication request to the information processing apparatus 21.

When the information processing apparatus 21 accesses another information processing apparatus in order to obtain information regarding vulnerability (for example, the type of an operating system (OS) or a version number), the information processing apparatus 21 might transmit an authentication request that does not include login information such as a user name and a password. Unauthorized access having such an intention may be referred to as "version scanning". In addition, when the information processing apparatus 21 searches for another information processing apparatus that may be logged in using stolen login information, the information processing apparatus 21 might transmit an authentication request including the stolen login information. Unauthorized access having such an intention may be referred to as "login scanning".

Here, the accessed information processing apparatus might not determine, depending on the setting thereof, that authentication has failed even for an authentication request that does not include correct login information. For example, upon receiving an authentication request whose user name and password fields are empty or an authentication request including an unregistered user name, an information processing apparatus that permits guest authentication (anonymous access) might transmit an authentication response indicating successful authentication. Therefore, it is not easy to improve the accuracy of determinations by defining only one fixed condition for the number of authentication failures and determining unauthorized access by determining whether or not the defined condition is satisfied.

In addition, even in a normal operation, the login frequencies of some information processing apparatuses other than the information processing apparatus 21 might be high, whereas the login frequencies of the other information processing apparatus might be low. For example, a file server that performs authentication is one of the former apparatuses, and a web server is one of the latter apparatuses. Therefore, it is not easy to improve the accuracy of determinations by defining only one fixed condition for the number of accesses and determining unauthorized access by determining whether or not the defined condition is satisfied. For this reason, the network monitoring apparatus 10 according to the first embodiment determines the possibility that unauthorized access has been performed by comprehensively examining the access states between the information processing apparatuses.

The network monitoring apparatus 10 monitors, on the basis of packets flowing through the network 30, whether or not a malicious program is performing unauthorized access. The network monitoring apparatus 10 may be a communication apparatus (such as a router or a firewall) that transmits packets, or may be a computer that obtains copies of packets from a communication apparatus and that analyzes the copies of packets.

The network monitoring apparatus 10 includes a reception unit 11, a storage unit 12, and a determination unit 13.

The reception unit 11 obtains packets transmitted between the plurality of information processing apparatuses. The reception unit 11 is, for example, a wired communication interface connected to the network 30 by a cable. In particular, the reception unit 11 obtains packets regarding one or a plurality of accesses from the information processing apparatus 21 to the information processing apparatuses 22 and 23. Each packet obtained by the reception unit 11 may be, for example, at least either a packet regarding an authentication request transmitted from the information processing apparatus 21 to the information processing apparatus 22 or 23 or a packet regarding an authentication response transmitted from the information processing apparatus 22 or 23 to the information processing apparatus 21.

The storage unit 12 stores condition information 14 indicating a plurality of conditions defined for packets in advance. The storage unit 12 may be a volatile memory such as a random access memory (RAM), or may be a non-volatile storage device such as a hard disk drive (HDD). Each condition indicated by the condition information 14 is a condition under which unauthorized access may be detected. However, each condition might be satisfied even when normal access other than unauthorized access has been performed. In the condition information 14, the plurality of conditions and combinations between an access source and an access destination are associated with each other. In the example illustrated in FIG. 1, conditions Condition_1 and Condition_3 are applied to access from the information processing apparatus 21 (Apparatus#1) to the information processing apparatus 22 (Apparatus#2), and conditions Condition_1 and Condition_2 are applied to access from the information processing apparatus 21 (Apparatus#1) to the information processing apparatus 23 (Apparatus#3).

One of the plurality of conditions may be a condition that a combination between the access source and the access destination is not registered in a certain list as permitted access or that a combination between the access source and the access destination is registered in the certain list as forbidden access.

In addition, one of the plurality of conditions may be a condition that N (N is an integer equal to or larger than 2) authentication failures have occurred, and another of the plurality of conditions may be a condition that M (M is an integer equal to or larger than 1 and smaller than N) authentication failures have occurred. In this case, the former or the latter is exclusively applied to a combination between the access source and the access destination. In addition, one of the plurality of conditions may be a condition that a user name included in an authentication request and a user name obtained from user information included in an authentication response corresponding to the authentication request are different from each other. Such a condition may be satisfied when it has been determined that guest authentication has been successful.

The determination unit 13 analyzes the packets obtained (captured) by the reception unit 11. The determination unit 13 may include a processor such as a central processing unit (CPU) or a digital signal processor (DSP), and may include a memory such as a RAM that stores programs to be executed by the processor. A group (multiprocessor) of a plurality of processors may be referred to as a "processor". In addition, the determination unit 13 may include an integrated circuit for a specific application such as an application-specific integrated circuit (ASIC) or a field-programmable gate array (FPGA).

The determination unit 13 selects, from among the plurality of conditions indicated by the condition information 14 stored in the storage unit 12, one or a plurality of conditions corresponding to a combination between an information processing apparatus as the access source and another information processing apparatus as the access destination. For example, upon obtaining a packet regarding access from the information processing apparatus 21 to the information processing apparatus 22, the determination unit 13 selects Condition_1 and Condition_3. In addition, for example, upon obtaining a packet regarding access from the information processing apparatus 21 to the information processing apparatus 23, the determination unit 13 selects Condition_1 and Condition_2. The access source may be identified, for example, from the source address of a packet regarding an authentication request or the destination address of a packet regarding an authentication response. In addition, the access destination may be identified, for example, from the destination address of a packet regarding an authentication request or the source address of a packet regarding an authentication response.

The determination unit 13 determines whether or not an obtained packet satisfies the selected one or plurality of conditions. In a determination as to a certain condition, for example, the source address or the destination address of the obtained packet may be referred to. In addition, in a determination as to another certain condition, for example, a result of authentication (information indicating successful authentication or failed authentication) included in a packet regarding an authentication response or user information included in a packet regarding an authentication request and the packet regarding an authentication response may be referred to. Whether or not some conditions are satisfied may be determined on the basis of only one access, and whether or not other conditions are satisfied may be determined on the basis of a plurality of accesses from the same access source to the same access destination.

The determination unit 13 then determines, on the basis of the number of conditions satisfied among the plurality of conditions indicated by the condition information 14, the possibility that an information processing apparatus has performed unauthorized access to another information processing apparatus. The possibility that unauthorized access has been performed may be represented as one of a plurality of warning levels (for example, three levels or more). For example, when a packet regarding access from the information processing apparatus 21 to the information processing apparatus 22 satisfies Condition_1 and Condition_3, the determination unit 13 determines the possibility that unauthorized access has been performed to be "high". In addition, for example, when a packet regarding access from the information processing apparatus 21 to the information processing apparatus 23 satisfies Condition_2 but does not satisfy Condition_1, the determination unit 13 determines the possibility that unauthorized access has been performed to be "medium".

At this time, the determination unit 13 may determine the possibility of unauthorized access for each combination between an information processing apparatus as the access source and an information processing apparatus as the access destination, or may determine the possibility of unauthorized access for each combination between a group of information processing apparatuses as the access sources and a group of information processing apparatuses as the access destinations. A group of information processing apparatuses may be a domain. A result of the determination of the possibility of unauthorized access may be displayed on a display device (for example, a display or a warning lamp) included in the network monitoring apparatus 10, or may be transmitted to a certain apparatus different from the network monitoring apparatus 10.

According to the information processing system according to the first embodiment, conditions according to a combination between the access source and the access destination are selected from a plurality of conditions regarding a packet. Accordingly, appropriate conditions that take into consideration differences in the information processing apparatuses involved in the access may be used.

In addition, the possibility of unauthorized access is determined in accordance with the number of conditions satisfied among the plurality of conditions. Therefore, compared to when only one fixed condition is set and it is determined that unauthorized access has been performed if access satisfies the condition and it is determined that unauthorized access has not been performed if access does not satisfy the condition, useful information that takes into consideration erroneous detection may be provided. In particular, when the possibility of unauthorized access is represented as one of a plurality of warning levels, it becomes easy for a system administrator to take appropriate measures.

Thus, according to the information processing system according to the first embodiment, it is possible to provide useful information regarding unauthorized access, which is hard to accurately distinguish from normal access.

Second Embodiment

Figure 2:
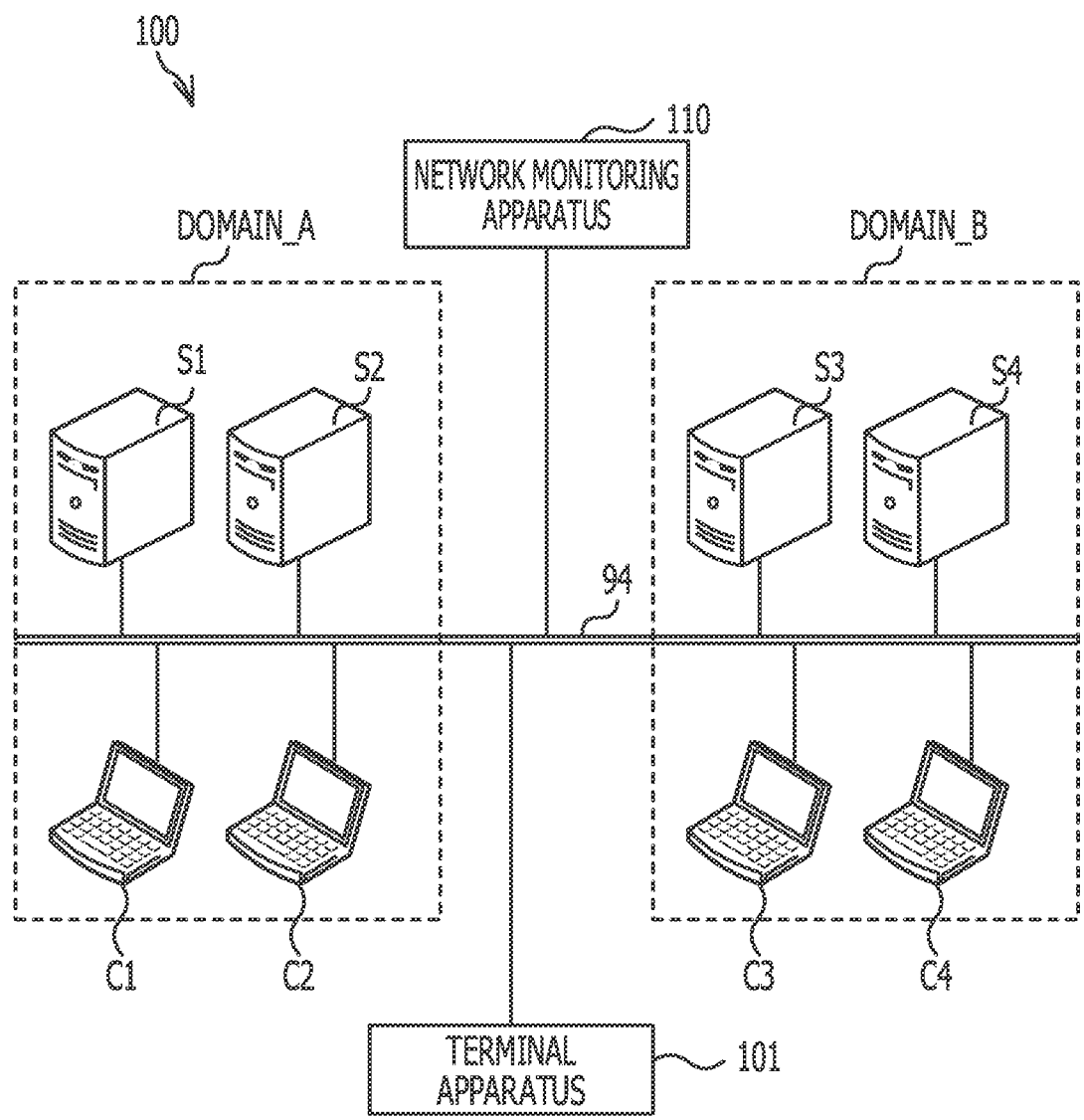
FIG. 2 is a diagram illustrating an example of an information processing system according to a second embodiment.

FIG. 2 is a diagram illustrating an example of an information processing system according to a second embodiment.

As illustrated in FIG. 2, an information processing system 100 according to the second embodiment includes a terminal apparatus 101, a network monitoring apparatus 110, a domain management server S1, web servers S2 and S4, a file server S3, and clients C1, C2, C3, and C4.

The terminal apparatus 101, the network monitoring apparatus 110, the domain management server S1, the web servers S2 and S4, the file server S3, and the clients C1, C2, C3, and C4 are connected to one another through a network 94. The domain management server S1, the web server S2, and the clients C1 and C2 belong to a domain Domain_A. The file server S3, the web server S4, and the clients C3 and C4 belong to a domain Domain_B.

The domain management server S1, the web servers S2 and S4, and the file server S3 are examples of a server apparatus. The clients C1, C2, C3, and C4 are examples of a client apparatus operated by a user. The domain management server S1, the web servers S2 and S4, the file server S3, and the clients C1, C2, C3, and C4 transmit packets through the network 94. In the transmission of packets performed by the domain management server S1, the web servers S2 and S4, the file server S3, and the clients C1, C2, C3, and C4, for example, the IP is used as a protocol in the network layer and the TCP is used as a protocol in the transport layer.

The network monitoring apparatus 110 is an administrative apparatus used by the administrator of the information processing system 100. The network monitoring apparatus 110 monitors packets transmitted through the network 94, and detects attacks made by malicious programs that have infected the client C1, C2, C3, or C4. For example, the network monitoring apparatus 110 detects unauthorized procedures for receiving authentication executed by the client C1, C2, C3, or C4 on the domain management server S1, the web server S2 or S4, or the file server S3.

The terminal apparatus 101 is an apparatus that receives a warning that is issued when the network monitoring apparatus 110 has detected an attack made by a malicious program. Upon receiving the warning from the network monitoring apparatus 110, for example, the terminal apparatus 101 displays the warning or outputs a warning sound in order to notify a watcher of the detection of an attack. In the following description, the functions and the operations of the network monitoring apparatus 110 will be described while assuming the system illustrated in FIG. 2.

Figure 3:
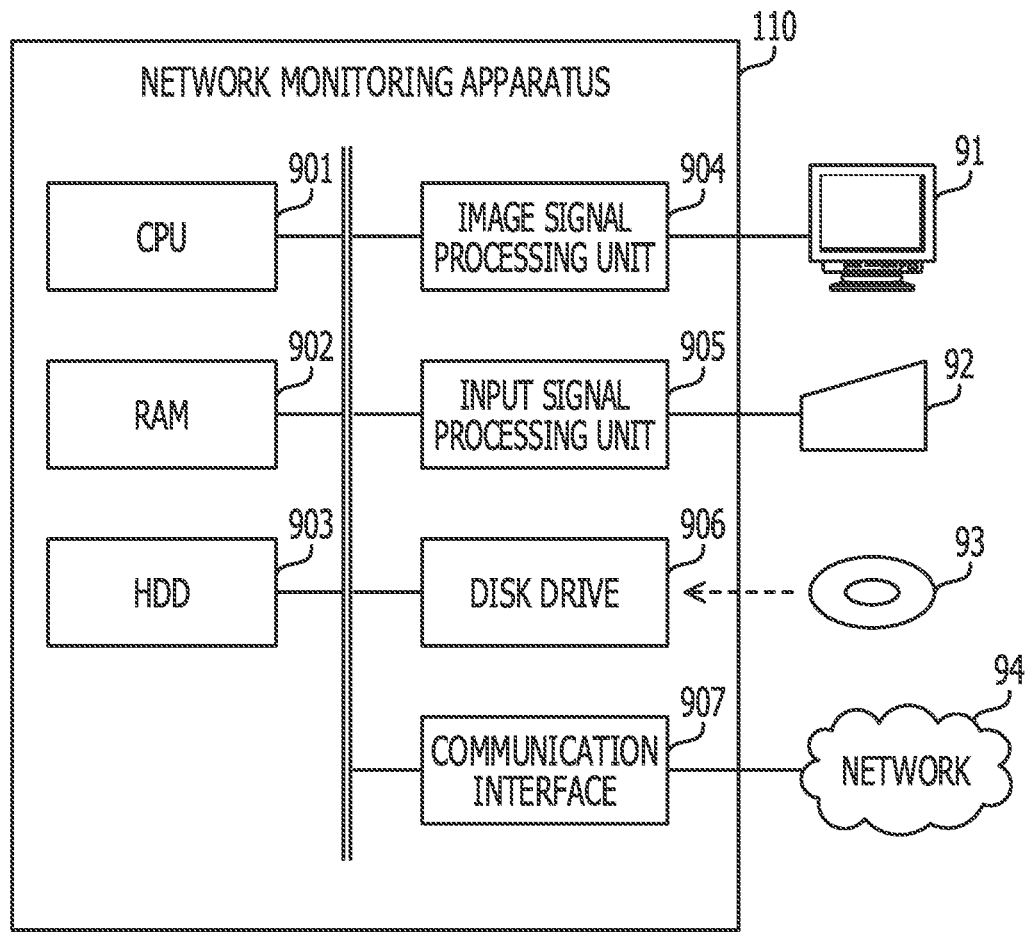
FIG. 3 is a diagram illustrating an example of a hardware configuration of a monitoring apparatus according to a second embodiment.

First, an example of hardware configuration capable of realizing the functions of the network monitoring apparatus 110 will be described with reference to FIG. 3. FIG. 3 is a diagram illustrating an example of the hardware configuration of the network monitoring apparatus 110 according to the second embodiment. As illustrated in FIG. 3, the network monitoring apparatus 110 includes, for example, a CPU 901, a RAM 902, an HDD 903, an image signal processing unit 904, an input signal processing unit 905, a disk drive 906, and a communication interface 907.

The CPU 901 is an example of the determination unit 13 according to the first embodiment. The RAM 902 and the HDD 903 are examples of the storage unit 12 according to the first embodiment. The CPU 901 and the communication interface 907 are examples of the reception unit 11 according to the first embodiment.

The CPU 901 is a processor including a computing element that executes commands described in programs. The CPU 901 loads at least part of programs and data stored in the HDD 903 into the RAM 902, and executes commands described in the programs. The CPU 901 may include a plurality of processor cores. Alternatively, the network monitoring apparatus 110 may include a plurality of CPUs 901. In this case, the network monitoring apparatus 110 may execute processes in parallel with one another.

The RAM 902 is a volatile memory for temporarily storing the programs to be executed by the CPU 901 and data to be used in processes. The network monitoring apparatus 110 may include a memory of a different type from the RAM 902. The network monitoring apparatus 110 may include a plurality of memories.

The HDD 903 is an example of a non-volatile storage device that stores an OS, firmware, programs such as application software, data to be used in processes, and the like. The network monitoring apparatus 110 may include a storage device of a different type from the HDD 903, such as a flash memory or a solid-state drive (SSD). The network monitoring apparatus 110 may include a plurality of storage devices.

The image signal processing unit 904 is controlled by the CPU 901 and outputs images to a display apparatus 91 connected to the network monitoring apparatus 110. The display apparatus 91 is a display device such as, for example, a cathode ray tube (CRT) display, a liquid crystal display (LCD), a plasma display panel (PDP), or an organic electroluminescent display (OELD).

The input signal processing unit 905 obtains an input signal from an input device 92 connected to the network monitoring apparatus 110, and transmits the input signal to the CPU 901. As the input device 92, for example, a mouse, a keyboard, a touch panel, a touch pad, a trackball, a remote controller, a button switch, or the like may be used.

The disk drive 906 is a reading device that reads programs and data recorded on a recording medium 93. As the recording medium 93, for example, a magnetic disk such as a flexible disk (FD) or an HDD, an optical disc such as a compact disc (CD) or a digital versatile disc (DVD), or a magneto-optical (MO) disk may be used. For example, the disk drive 906 is controlled by the CPU 901 and stores the programs and the data read from the recording medium 93 in the RAM 902 or the HDD 903.

The communication interface 907 is an interface for communicating with another computer through the network 94. The communication interface 907 may be a wired interface or may be a wireless interface. The functions of the terminal apparatus 101, the domain management server S1, the web servers S2 and S4, the file server S3, and the clients C1, C2, C3, and C4 may be realized by using part or all of the hardware configuration illustrated in FIG. 3.

Figure 4:
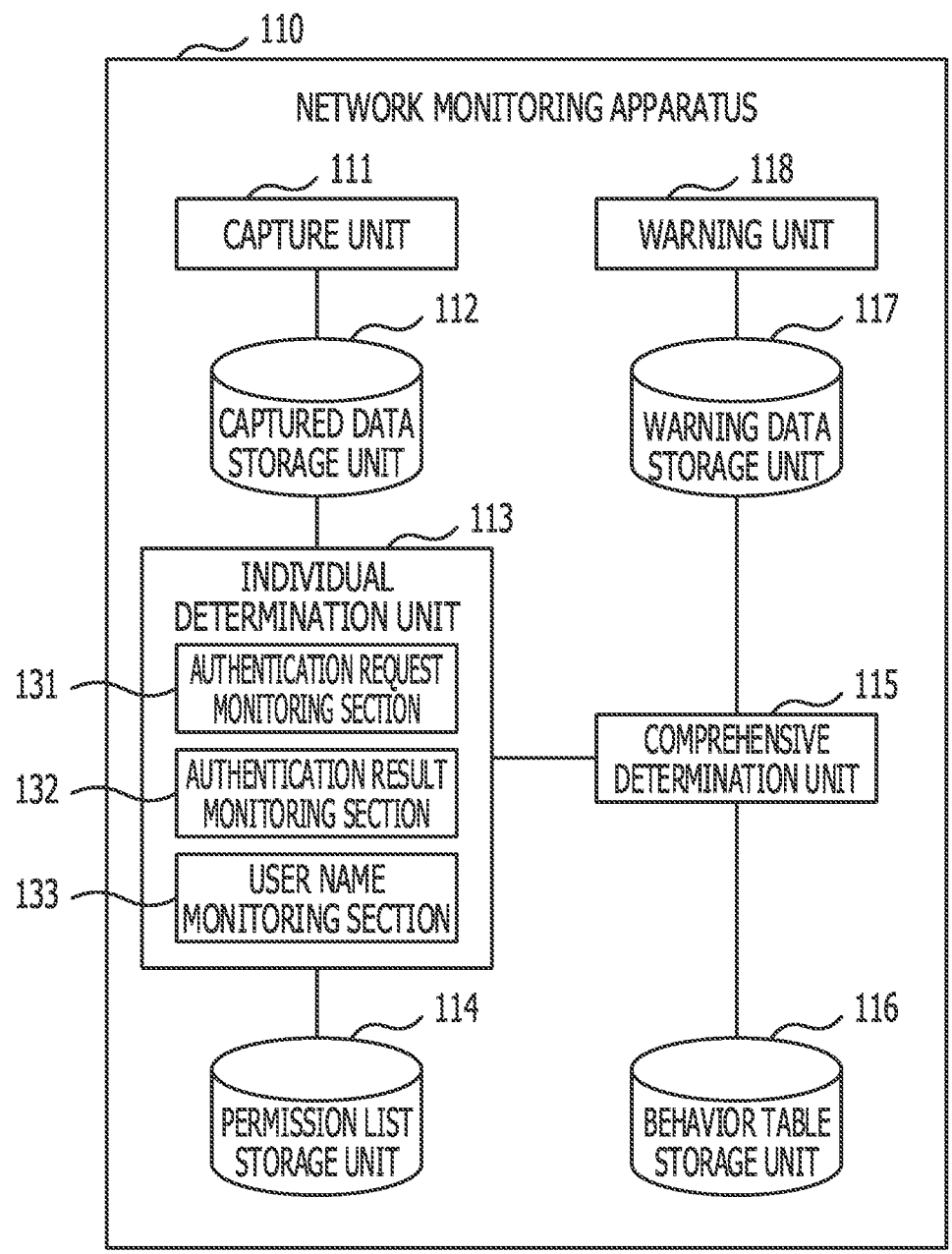
FIG. 4 is a diagram illustrating an example of a functional configuration of a monitoring apparatus according to a second embodiment.

By using the above-described hardware configuration, the functions of the network monitoring apparatus 110 illustrated in FIG. 4 may be realized. FIG. 4 is a diagram illustrating an example of the functional configuration of the network monitoring apparatus 110 according to the second embodiment.

As illustrated in FIG. 4, the network monitoring apparatus 110 includes a capture unit 111, a captured data storage unit 112, an individual determination unit 113, a permission list storage unit 114, and a comprehensive determination unit 115. Furthermore, the network monitoring apparatus 110 includes a behavior table storage unit 116, a warning data storage unit 117, and a warning unit 118.

Part or all of the functions of the capture unit 111, the individual determination unit 113, the comprehensive determination unit 115, and the warning unit 118 may be realized by the CPU 901 by executing a program module. Alternatively, part or all of the functions of the capture unit 111, the individual determination unit 113, the comprehensive determination unit 115, and the warning unit 118 may be realized as an electronic circuit. The captured data storage unit 112, the permission list storage unit 114, the behavior table storage unit 116, and the warning data storage unit 117 are storage regions secured in the RAM 902 or the HDD 903.

The capture unit 111 captures a packet transferred through the network 94. The capture unit 111 adds a reception time (timestamp) to the captured packet and stores the packet in the captured data storage unit 112. The captured data storage unit 112 stores the packet captured by the capture unit 111. The packet stored in the captured data storage unit 112 is used by the individual determination unit 113.

The individual determination unit 113 analyzes an authentication request or an authentication response included in a packet stored in the captured data storage unit 112, and collects information for detecting an unauthorized procedure for receiving authentication performed through the network 94. The individual determination unit 113 includes an authentication request monitoring section 131, an authentication result monitoring section 132, and a user name monitoring section 133.

The authentication request monitoring section 131 determines whether or not a packet captured by the capture unit 111 and stored in the captured data storage unit 112 is an authentication response. For example, in the case of a procedure for receiving authentication according to the Server Message Block (SMB) protocol, whether or not the packet is an authentication response may be determined by checking a source port number and the content (a user name, a result of authentication, and the like) of an SMB header included in the packet.

SMB is used for realizing file services such as file sharing. SMB provides a file sharing service, a printer sharing service, interprocess communication (IPC), a mail slot function, and the like. SMB also has a function of obtaining a list of open resources of computers in a network.

The IPC is a mechanism in which data is communicated between a plurality of processes (or a plurality of threads). The mail slot function is a function of providing a mechanism (mail slot) in which messages transmitted from a plurality of sources are temporarily stored, so that a destination is able to sequentially obtain and process the messages.

The SMB protocol is a file service protocol corresponding to the application layer and the presentation layer in the Open Systems Interconnection (OSI) reference model. As a lower protocol of the SMB protocol, for example, network basic input/output system (NetBIOS) extended user interface (NetBEUI), NetBIOS over TCP/IP (NBT), TCP/IP, internetwork packet exchange (IPX)/sequenced packet exchange (SPX), or the like is used. There is also a protocol called "common Internet file system (CIFS)", with which a file sharing service and the like may be used through a network such as the Internet.

SMB assumes a peer-to-peer operation. That is, in SMB, an operation is assumed in which a client transmits a certain request to a server and the server responds to the request. In a procedure for receiving authentication, a client to be authenticated transmits an authentication request for requesting authentication to a server that performs authentication, and the server transmits an authentication response including a result of the authentication to the client in response to the authentication request.

An IP header of an SMB packet regarding an authentication request or an authentication response includes the IP addresses of the source and the destination, and a TCP header of the SMB packet includes the port numbers of the source and the destination. An SMB header of an SMB packet regarding an authentication request includes a user name and information for authentication (information using a password or the like). An SMB header of an SMB packet regarding an authentication response includes user information for identifying a user name and information such as a result of authentication. Therefore, the authentication request monitoring section 131 may identify an authentication request and an authentication response by referring to these pieces of information.

When it has been determined that a packet captured by the capture unit 111 and stored in the captured data storage unit 112 is an authentication response, the authentication request monitoring section 131 searches for an authentication request corresponding to the authentication response. For example, the authentication request monitoring section 131 searches for a packet whose destination IP address and source IP address match with the source IP address and the destination IP addresses, respectively, of the authentication response, whose destination port number and source port number match with the source port number and the destination port number, respectively, of the authentication response, and includes information for authentication.

When the authentication response and the authentication request corresponding to the authentication response has been detected, the authentication request monitoring section 131 determines the attribute of the authentication request. The attribute is determined using an authentication permission list stored in the permission list storage unit 114. The permission list storage unit 114 is a storage unit for storing the authentication permission list. The authentication permission list is data in which information indicating an authentication apparatus and an access apparatus and a domain name to which the access apparatus belongs are associated with each other for access that is not unnatural and that may be performed in the normal operation.

The authentication permission list may be generated on the basis of the access states of the network 94. For example, in a period in which the information processing apparatuses are not infected with malicious programs, combinations between an authentication request and an authentication response communicated through the network 94 are monitored, and when an authentication response indicating successful authentication has been detected, the authentication permission list may be generated from information included in a corresponding authentication request. Since IP addresses indicating an authentication apparatus and an access apparatus and a domain name to which the access apparatus belongs may be obtained from the authentication request, the authentication permission list is generated using these pieces of information. Among pieces of information included in the authentication permission list, for example, an IP address indicating an access apparatus is set to an attribute Attribute_1 and a domain name to which the access apparatus belongs is set to an attribute Attribute_2, and then information indicating these attributes is used to determine the attribute of an authentication request.

Upon detecting an authentication request corresponding to an authentication response stored in the captured data storage unit 112, the authentication request monitoring section 131 determines whether or not the attribute of the authentication request matches with an attribute described in the authentication permission list. For example, the authentication request monitoring section 131 determines whether or not the attribute of the authentication request matches with the above-mentioned Attribute_1. Furthermore, the authentication request monitoring section 131 determines whether or not the attribute of the authentication request matches with the above-mentioned Attribute_2. When attributes other than Attribute_1 and Attribute_2 have been set, whether or not the attributes of the authentication request matches with those attributes is also determined.

A result of a determination (for example, a result of a determination as to Attribute_1) as to whether or not a combination between an authentication apparatus and an access apparatus matches with the authentication permission list is input to the comprehensive determination unit 115. As described above, in the authentication permission list, combinations between an access apparatus and an authentication apparatus are described for access that is not unnatural and that may be performed in the normal operation. Therefore, as a result of the above-described determination, for example, whether occurrence of a procedure for receiving authentication itself is unnatural or occurrence of a procedure for receiving authentication itself is not unnatural but it becomes unnatural when one or a plurality of authentication failures have occurred may be determined.

Upon determining that the authentication apparatus, the access apparatus, and the domain name match with the authentication permission list (for example, upon determining that both Attribute_1 and Attribute_2 are matched), the authentication request monitoring section 131 searches the packets stored in the captured data storage unit 112 for authentication responses received in a certain period preceding the current time. Since the packets stored in the captured data storage unit 112 are provided with timestamps indicating reception times, the authentication responses received in the certain period preceding the current time may be searched for by referring to the timestamps.

The authentication result monitoring section 132 refers to the authentication responses received in the certain period preceding the current time and determines whether or not N or more authentication failures have occurred. For example, the authentication result monitoring section 132 refers to a result of authentication included in the SMB header of each authentication response detected in the search process and counts the number of authentication responses including a result of authentication indicating failed authentication. The authentication result monitoring section 132 then determines whether or not the number of authentication responses counted is equal to or larger than N. A result of the determination is input to the comprehensive determination unit 115. The threshold N is an integer equal to or larger than 2, and determined by the administrator of the information processing system 100 in advance.

In addition, if it is determined that a combination between an authentication apparatus and an access apparatus matches with the authentication permission list (for example, Attribute_1 is matched) but if it is determined that the domain name does not match with the authentication permission list (for example, Attribute_2 is not matched), the authentication result monitoring section 132 determines whether or not an authentication response indicates failed authentication. For example, by referring to a result of authentication included in the SMB header of the authentication response, the authentication result monitoring section 132 may determine whether or not the authentication response indicates failed authentication. For example, when there is an error in the combination between a user name and a password, an authentication response whose SMB header includes a result of authentication indicating failed authentication may be transmitted from the authentication apparatus to the access apparatus. A result of the determination is input to the comprehensive determination unit 115.

The user name monitoring section 133 determines whether or not a user name included in an authentication request and a user name obtained from user information included in an authentication response are different from each other. By referring to the SMB header of the authentication request and the SMB header of the authentication response, whether or not a user name at the time of the authentication request and a user name at the time of the authentication response are different from each other may be determined. A result of the determination is input to the comprehensive determination unit 115.

The comprehensive determination unit 115 determines, on the basis of results of determinations obtained from the individual determination unit 113, the possibility that a captured authentication request makes an attack. At this time, the comprehensive determination unit 115 refers to a behavior table stored in the behavior table storage unit 116. The behavior table storage unit 116 is a storage unit that stores the behavior table, which is a data table for determining the possibility that an authentication request makes an attack. In the behavior table, a plurality of conditions are assigned to a combination of an authentication apparatus, an access apparatus, and a domain name and results of determinations input from the individual determination unit 113. The configuration of the behavior table will be described later.

The comprehensive determination unit 115 determines, on the basis of a result of each determination input from the individual determination unit 113, whether or not each condition described in the behavior table is satisfied. If the number of conditions satisfied is large, the comprehensive determination unit 115 determines that it is likely that the captured authentication request makes an attack. If the number of conditions satisfied is small, the comprehensive determination unit 115 determines that it is unlikely that the captured authentication request makes an attack.

The comprehensive determination unit 115 stores, in the warning data storage unit 117, warning data in which a warning level indicating the possibility of an attack, information regarding an authentication apparatus, an access apparatus, a domain name, and the like, information regarding results of determinations made by the individual determination unit 113, and the like are associated with one another. The warning data storage unit 117 is a storage unit that stores the warning data generated by the comprehensive determination unit 115. The warning data stored in the warning data storage unit 117 is provided for the administrator by the warning unit 118.

The warning unit 118 determines whether or not simple network management protocol (SNMP) has been set to the network monitoring apparatus 110. If SNMP has been set to the network monitoring apparatus 110, the warning unit 118 transmits the warning data stored in the warning data storage unit 117 to the terminal apparatus 101 using an SNMP trap. If SNMP has not been set to the network monitoring apparatus 110, for example, the warning unit 118 transmits the warning data stored in the warning data storage unit 117 to the terminal apparatus 101 using an electronic mail.

An example of the information processing system 100 and the network monitoring apparatus 110 according to the second embodiment and the like have been described above.

The technique according to the second embodiment will be further described hereinafter with reference to a specific example.

Figure 5:
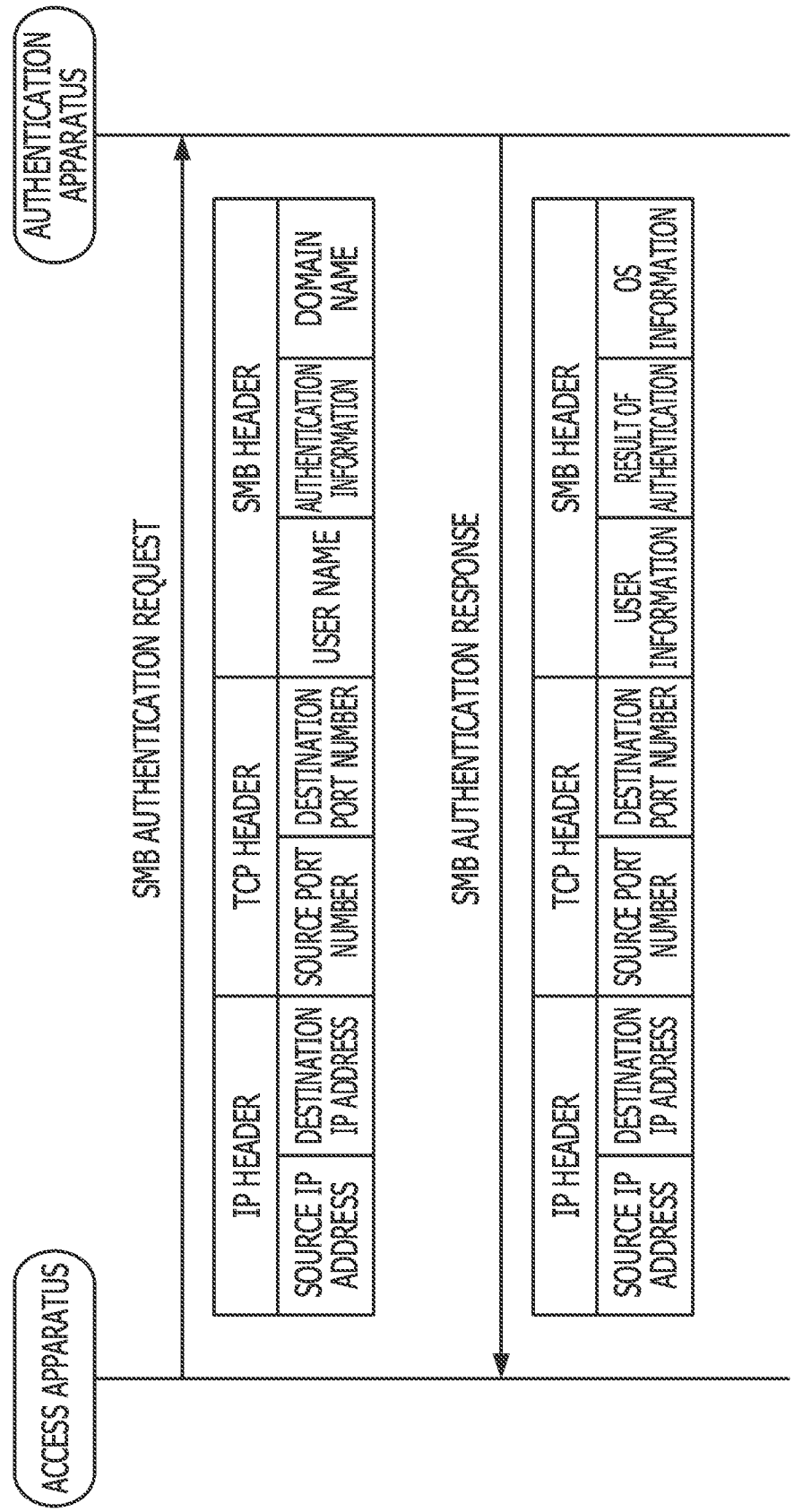
FIG. 5 is a diagram illustrating an example of an authentication method.

First, a specific example of an authentication method in SMB will be described with reference to FIG. 5. FIG. 5 is a diagram illustrating an example of the authentication method.

An SMB packet includes an IP header, a TCP header, and an SMB header. The IP header includes the IP addresses of a source and a destination. The TCP header includes the port numbers of the source and the destination. In the case of an authentication request, the SMB header includes a user name, authentication information, and a domain name. In the case of an authentication response, the SMB header includes user information, a result of authentication, and OS information.

The user name included in an authentication request is information for identifying a user who desires to be authenticated. The user information included in an authentication response is information for identifying an authenticated user. The authentication information includes information regarding a password, and is used for authentication along with the user name. The domain name indicates the name of a domain to which the access apparatus belongs. The result of authentication is information indicating whether or not authentication using the user information, the password, and the domain name included in the authentication request has been successful. The OS information is information such as the name and the version number of an OS operating on the authentication apparatus. Depending on the type of authentication request, the OS information is omitted from the authentication response.

Figure 6:
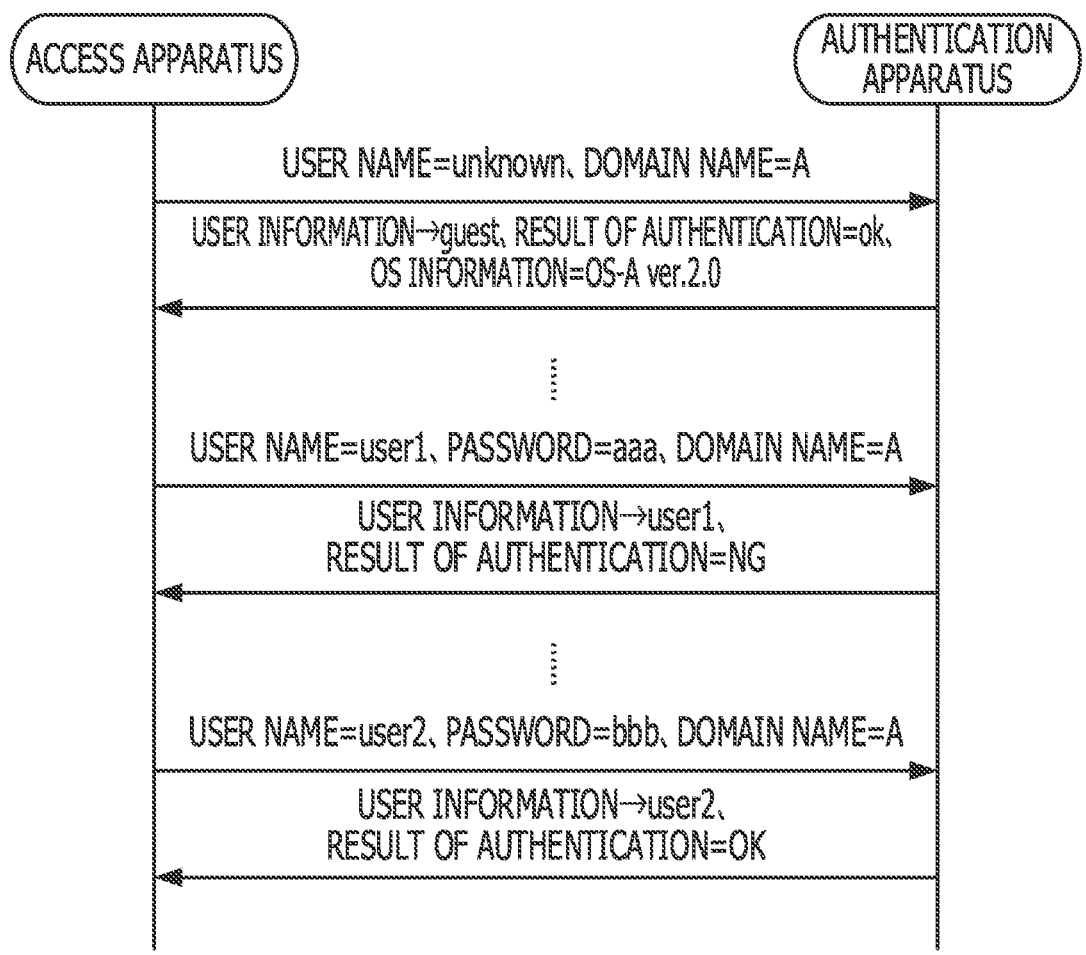
FIG. 6 is a diagram illustrating an example of a manner in which a malicious program attacks an authentication apparatus.

Authentication in SMB is performed using the authentication request and the authentication response illustrated in FIG. 5. The authentication request is transmitted from an access apparatus to an authentication apparatus, and the authentication apparatus that has received the authentication request transmits the authentication response indicating successful authentication to the access apparatus, thereby completing the authentication. For example, a malicious program trying to infect an authentication apparatus attacks the authentication apparatus in a manner illustrated in FIG. 6. FIG. 6 is a diagram illustrating an example of a manner in which a malicious program attacks an authentication apparatus.

As illustrated in FIG. 6, when the access apparatus has been infected with a malicious program, the access apparatus might execute a process called "version scanning" for checking the type and the version of the OS operating on the authentication apparatus and the like. For example, the access apparatus transmits an authentication request whose SMB header includes a user name "unknown" (may be an arbitrarily selected user name or may be empty) and a domain name "A" to the authentication apparatus. Upon receiving the authentication request, for example, the authentication apparatus might transmit an authentication response whose SMB header includes a user name "guest" (guest account), a result of authentication indicating successful authentication, and OS information indicating the type and the version of the OS operating thereon.

As in the example illustrated in FIG. 6, even when an authentication request has been transmitted while specifying a nonexistent user name or without specifying a user name, authentication might seem to be successful in the case of version scanning. However, the user name included in the authentication response is different from the user name (empty when not specified) included in the authentication request. Therefore, by monitoring whether or not the user name is different between the authentication request and the authentication response, it is possible to detect version scanning performed while specifying a nonexistent user name or without specifying a user name. Even if a guest account is authenticated, the types of operation that may be performed by the access apparatus on the authentication apparatus are often strictly limited.

A malicious program might execute a process called "login scanning" for checking whether or not authentication becomes successful using a specified user name and password. In this case, the access apparatus repeatedly attempts to be authenticated by the authentication apparatus while changing the user name and the password. For example, the malicious program might attempt to be authenticated using a user name and a password stolen from the access apparatus or using information that seems to be a user name and a password obtained by monitoring input operations performed by a user using a keyboard. The access apparatus transmits an authentication request whose SMB header includes such a user name, authentication information, and a domain name to the authentication apparatus. If the user name is registered in the authentication apparatus but the password is incorrect, the authentication apparatus transmits an authentication response whose SMB header includes the user name and a result of authentication indicating failed authentication to the access apparatus.

The access apparatus repeatedly executes the above-described procedure for receiving authentication until authentication becomes successful. When the authentication has become successful, the authentication apparatus transmits an authentication response whose SMB header includes a user name and a result of authentication indicating successful authentication to the access apparatus. When the authentication has become successful, the malicious program makes further attacks using the correct user name and password with which the authentication has become successful. In the following description, a method for detecting an attack made by such a malicious program will be described.

Figure 7:
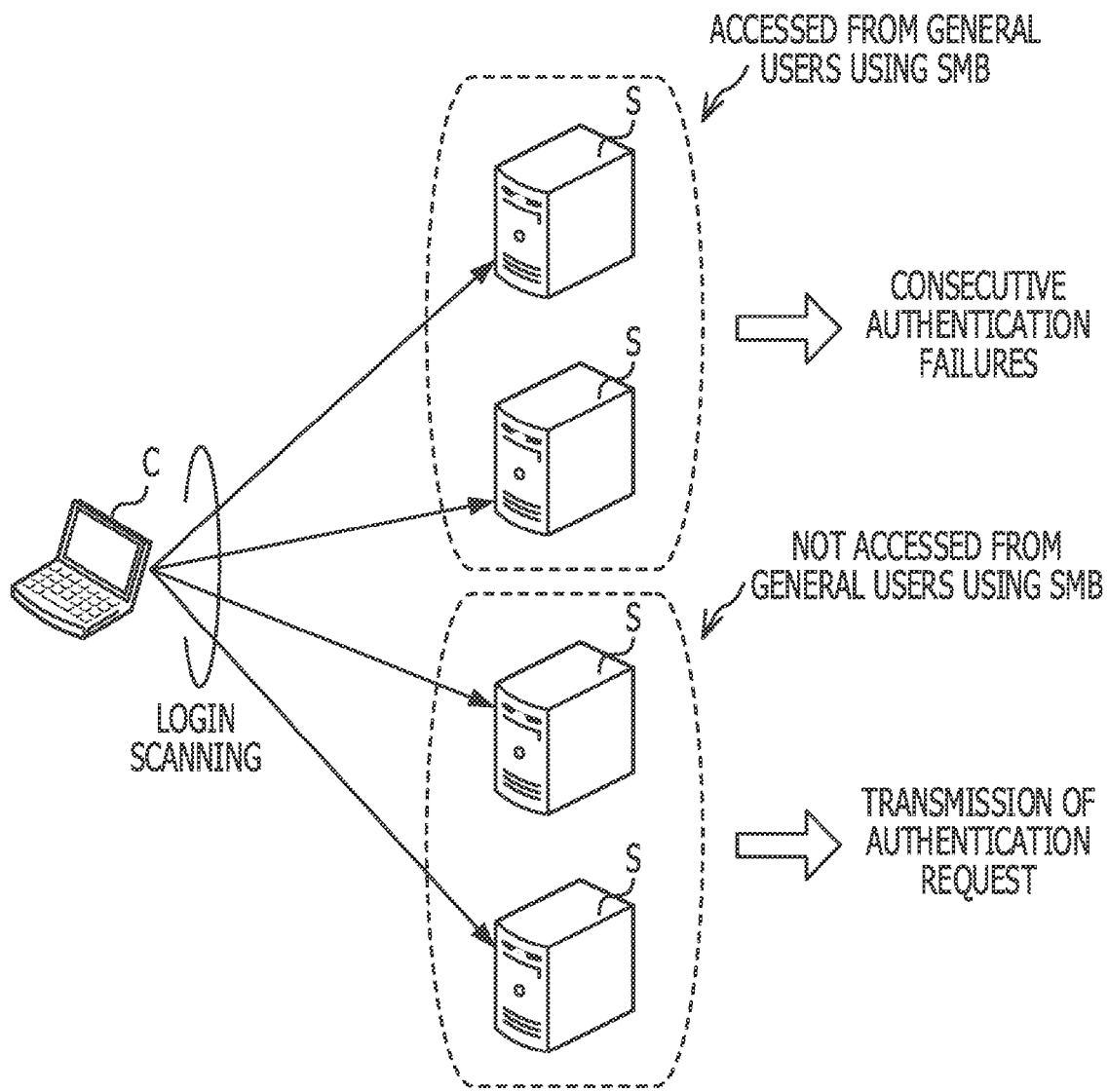
FIG. 7 is a diagram illustrating a method for detecting login scanning in accordance with authentication setting.

FIG. 7 is a diagram illustrating a method for detecting login scanning in accordance with authentication setting. For example, as illustrated in FIG. 7, assume a system including a client C infected with a malicious program and a plurality of servers S. Here, it is to be noted that some of the plurality of servers S are accessed from general users using SMB even in the normal operation, whereas the other servers S are normally not accessed from general users using SMB. The former servers S include, for example, domain management servers, and file servers that may be logged in by general users who are not the administrator. The latter servers S include, for example, web servers that are normally not logged in by general users who are not the administrator.

Even in the case of a domain management server, a file server, or the like, however, authentication fails when, for example, a user has input an incorrect user name or password. Therefore, as a method for determining that authentication requests transmitted from the client C, which has been infected with a malicious program, to these servers S are attacks, for example, a method in which consecutive authentication failures are detected or the like may be used. On the other hand, in the case of a web server or the like, since an authentication request is normally not received from a general user, an authentication request may be determined to be an attack when the authentication request has been received for the first time.

Figure 8:
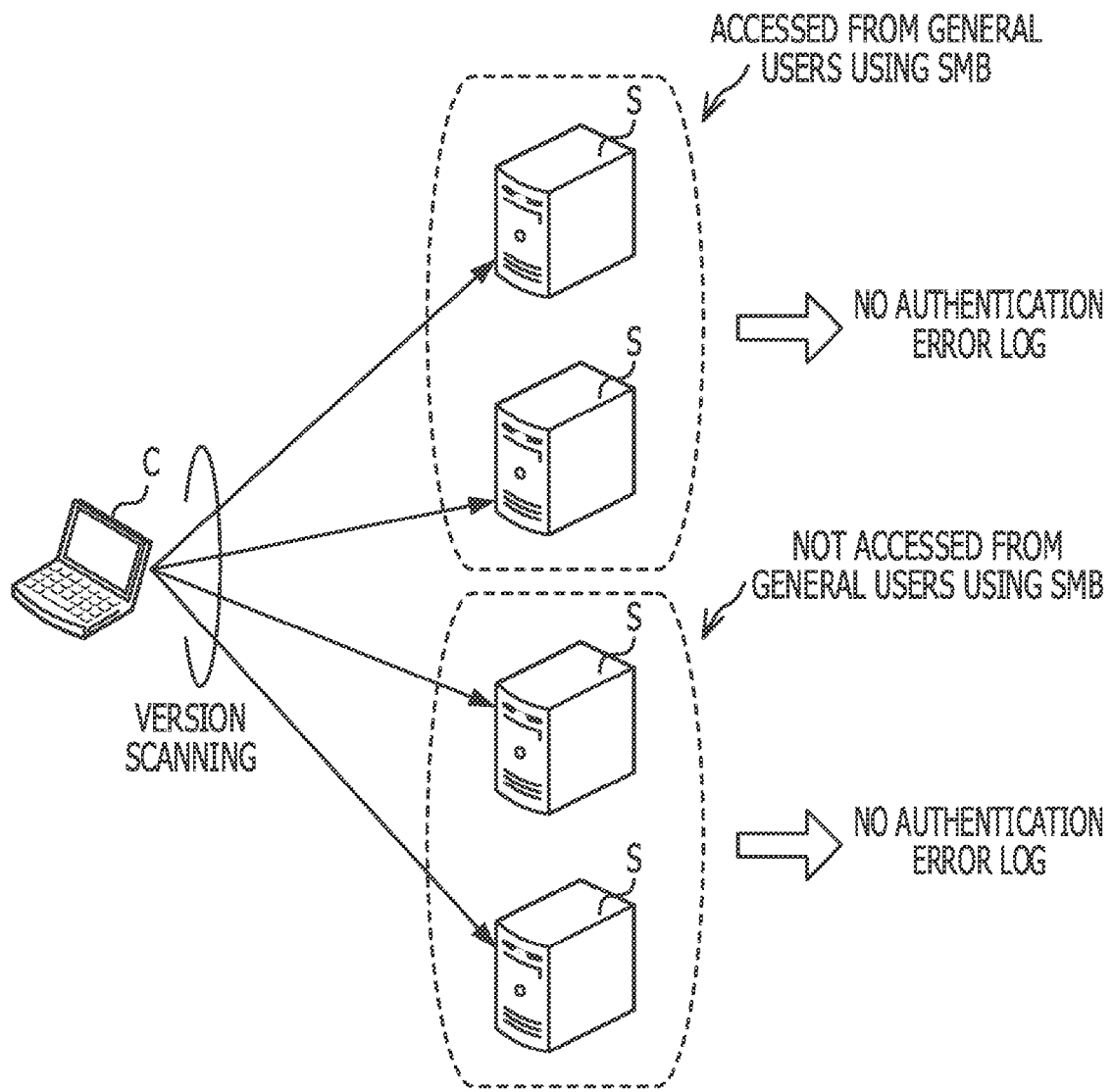
FIG. 8 is a diagram illustrating an operation performed by an authentication apparatus at a time when version scanning is performed.

FIG. 8 is a diagram illustrating an operation performed by an authentication apparatus at a time when version scanning is performed. When the client C has executed version scanning, an authentication failure might not occur regardless of whether or not the server S in question is a server that might be accessed by general users who are not the administrator as illustrated in FIG. 8, and accordingly an authentication error log in which a history of authentication failures are recorded does not remain in the server S.

Figure 9:
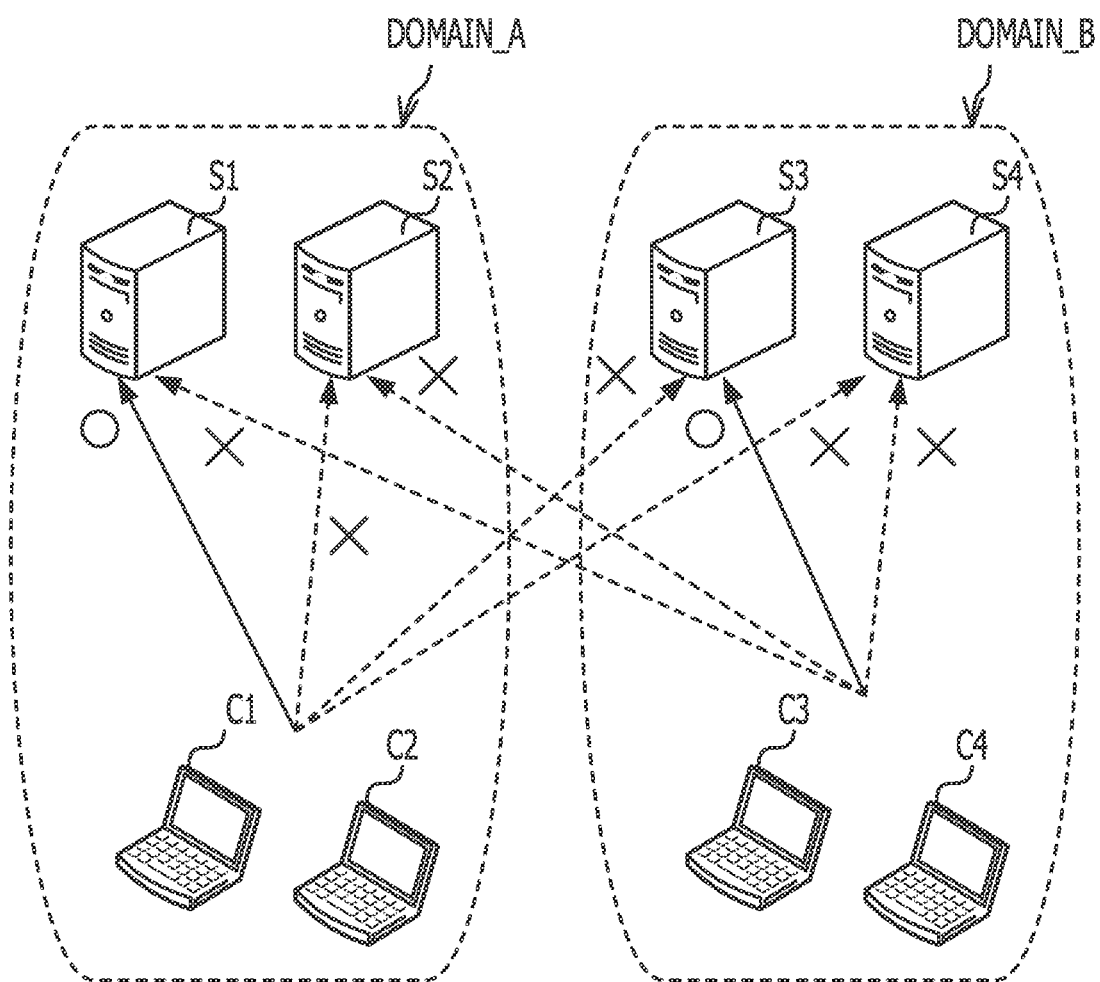
FIG. 9 is a diagram illustrating an example of a method for generating an authentication permission list according to a second embodiment.

For this reason, in the second embodiment, a method for detecting an attack that may be used even when a method for detecting an attack to be used is different depending on the type of server S involved will be proposed. In order to realize this detection method, a data table (authentication permission list) is used in which an authentication apparatus that performs authentication, an access apparatus to be authenticated by the authentication apparatus or a domain name, and the like are described. This authentication permission list is, for example, generated using a method illustrated in FIG. 9. FIG. 9 is a diagram illustrating an example of a method for generating an authentication permission list according to the second embodiment.

Assume the above-described information processing system 100. For example, authentication requests transmitted from the client C1, C2, C3, or C4 to the domain management server S1, the web server S2 or S4, or the file server S3 and authentication responses corresponding to the authentication requests are monitored, and combinations between an apparatus and a domain name with which authentication has been successful are collected. In the example illustrated in FIG. 9, procedures for receiving authentication performed by the clients C1 or C2 belonging to Domain_A on the domain management server S1 are successful. In addition, procedures for receiving authentication performed by the clients C3 or C4 belonging to Domain_B on the file server S3 are successful. On the other hand, procedures for receiving authentication other than the foregoing ones fail.

In the above-described case, an authentication permission list illustrated in FIG. 10 is generated. FIG. 10 is a diagram illustrating an example of the authentication permission list according to the second embodiment. An authentication request includes an IP address (destination IP address) indicating an authentication apparatus and an IP address (source IP address) indicating an access apparatus. The authentication request further includes a domain name specified by the access apparatus. Since authentication responses include results of authentication, the authentication permission list illustrated in FIG. 10 may be generated by collecting information from authentication requests corresponding to authentication responses indicating successful authentication. The authentication permission list is stored in the permission list storage unit 114.

Although a method for generating an authentication permission list by monitoring traffic in the normal operation has been described above, for example, the administrator may manually create an authentication permission list, instead.

It is preferable not to determine whether or not an authentication request has been made by an attack only on the basis of a determination as to whether or not the authentication request matches with the authentication permission list. Therefore, in the second embodiment, whether or not a captured authentication request has been made by an attack is comprehensively determined in consideration of whether or not authentication has been successful, the number of authentication failures occurred in the past, changes in the user name, in addition to whether or not the authentication request matches with the authentication permission list. In such a comprehensive determination, a data table (behavior table) illustrated in FIG. 11 is used. FIG. 11 is a diagram illustrating an example of the behavior table according to the second embodiment. The behavior table may be generated from the authentication permission list or may be manually created by the administrator.

As illustrated in FIG. 11, in the behavior table, information indicating an authentication apparatus, information indicating an access apparatus and a domain name, and a plurality of conditions (Condition_1 to Condition_4) are associated with one another.

Details of each condition are as follows.

Condition_1 is a condition for determining whether or not an authentication request has been transmitted from an access apparatus that is not registered in the authentication permission list to an authentication apparatus. When an authentication request has been transmitted from an access apparatus that is registered in the authentication permission list to an authentication apparatus, Condition_1 becomes "normal". Otherwise, Condition_1 becomes "abnormal".

Condition_2 is a condition for determining whether or not authentication has failed. When authentication has failed, Condition_2 becomes "abnormal", and when authentication has been successful, Condition_2 becomes "normal".

Condition_3 is a condition for determining whether or not authentication has failed N times or more between the same access apparatus and the same authentication apparatus in a certain period in the past. When authentication has failed N times or more between the same access apparatus and the same authentication apparatus in the certain period in the past, Condition_3 becomes "abnormal". Otherwise, Condition_3 becomes "normal".

Condition_4 is a condition for determining whether or not a user name has changed between an authentication request and an authentication response. When the user name has changed between an authentication request and an authentication response, Condition_4 becomes "abnormal". When a user name has not changed between an authentication request and an authentication response, Condition_4 becomes "normal".

Combinations between an access apparatus and an authentication apparatus to which each condition is applied are as follows.

Condition_1 is applied to all combinations between an access apparatus and an authentication apparatus. Condition_2 is applied when the combination between an access apparatus and an authentication apparatus is described in the authentication permission list and the access apparatus has performed a procedure for receiving authentication by specifying a domain different from one to which the authentication apparatus belongs. Condition_3 is applied when the combination between an access apparatus and an authentication apparatus is described in the authentication permission list and the access apparatus has performed a procedure for receiving authentication by specifying a domain to which the authentication apparatus belongs. Condition_4 is applied to combinations between an access apparatus and an authentication apparatus described in the authentication permission list.

For example, when the client C1 has performed a procedure for receiving authentication on the domain management server S1, Condition_1, Condition_3, and Condition_4 are applied if the client C1 has specified Domain_A in an authentication request. If the client C1 has not specified Domain_A in an authentication request, Condition_1, Condition_2, and Condition_4 are applied. The same holds true when the client C2 has performed a procedure for receiving authentication on the domain management server S1.

In the information processing system 100, the clients C1 and C2 are normally managed as apparatuses belonging to Domain_A, and supposed to specify Domain_A when transmitting authentication requests to the domain management server S1. On the other hand, because the clients C1 and C2 may arbitrarily specify the domain to be used for authentication, it is possible that the clients C1 and C2 specify Domain_B and transmit authentication requests. However, because the domain is not frequently switched, Condition_3 is applied when Domain_A, to which the clients C1 and C2 normally belong, has been specified, or otherwise Condition_2, which is stricter (a threshold for the number of authentication failures is smaller) than Condition_3, is applied.

When the client C3 has performed a procedure for receiving authentication on the domain management server S1, Condition_1 is applied. In the behavior table illustrated in FIG. 11, the procedure for receiving authentication performed by the client C3 on the domain management server S1 is "abnormal" in Condition_1. The same holds true when the client C4 has performed a procedure for receiving authentication on the domain management server S1.

When the client C1 has performed a procedure for receiving authentication on the web server S2 or S4, Condition_1 is applied. The web servers S2 and S4 are normally not logged in by general users who are not the administrator. Therefore, authentication requests transmitted from the client C1 to the web servers S2 and S4 do not match with the authentication permission list, and Condition_1 becomes "abnormal". The same holds true for procedures for receiving authentication performed by the clients C2, C3, or C4 on the web servers S2 and S4.

When the client C3 has performed a procedure for receiving authentication on the file server S3, Condition_1, Condition_3, and Condition_4 are applied if the client C3 has specified Domain_B in an authentication request. If the client C3 has not specified Domain_B in an authentication request, Condition_1, Condition_2, and Condition_4 are applied. The same holds true when the client C4 has performed a procedure for receiving authentication on the file server S3.

In the information processing system 100, the clients C3 and C4 are managed as apparatuses belonging to Domain_B, and supposed to specify Domain_B when transmitting authentication requests to the file server S3. On the other hand, because the clients C3 and C4 may arbitrarily specify the domain to be used for authentication, it is possible that the clients C3 and C4 specify Domain_A and transmit authentication requests. However, because the domain is not frequently switched, Condition_3 is applied when Domain_B, to which the clients C3 and C4 normally belong, has been specified, or otherwise Condition_2, which is stricter (a threshold for the number of authentication failures is smaller) than Condition_3, is applied.

When the client C1 has performed a procedure for receiving authentication on the file server S3, Condition_1 is applied. In the behavior table illustrated in FIG. 11, the procedure for receiving authentication performed by the client C1 on the file server S3 is "abnormal" in Condition_1. The same holds true when the client C2 has performed a procedure for receiving authentication on the file server S3.

In the second embodiment, the number of "abnormal" results is counted for each condition in the behavior table, and if the number of "abnormal" results is large, it is determined that the authentication request in question is likely to make an attack.

Thus, by performing a comprehensive determination using the behavior table in consideration of whether or not authentication has been successful, the number of authentication failures occurred in the past, changes in the user name, in addition to whether or not an authentication request matches with the authentication permission list, an attack may be accurately detected. When it has been determined using this method that an authentication request makes an attack, warning data illustrated in FIG. 12 is generated. FIG. 12 is a diagram illustrating an example of the warning data according to the second embodiment.

As illustrated in FIG. 12, the warning data includes information indicating an authentication apparatus, information indicating an access apparatus and a domain name, details of detection of abnormality, and a warning level. The details of detection of abnormality include the number of "abnormal" results in each condition described in the behavior table and the like. The warning level indicates the possibility of an attack. The warning data is stored in the warning data storage unit 117. The warning data is transmitted to the terminal apparatus 101 used by the administrator by the warning unit 118. By referring to the warning data, it is possible to identify an authentication apparatus that might be being exposed to an attack and an access apparatus attacking the authentication apparatus. Furthermore, by referring to the details of detection of abnormality and the warning level, it is possible to enable the administrator to further examine the possibility of an attack.

The technique according to the second embodiment has been described above with reference to a specific example.

Figure 13:
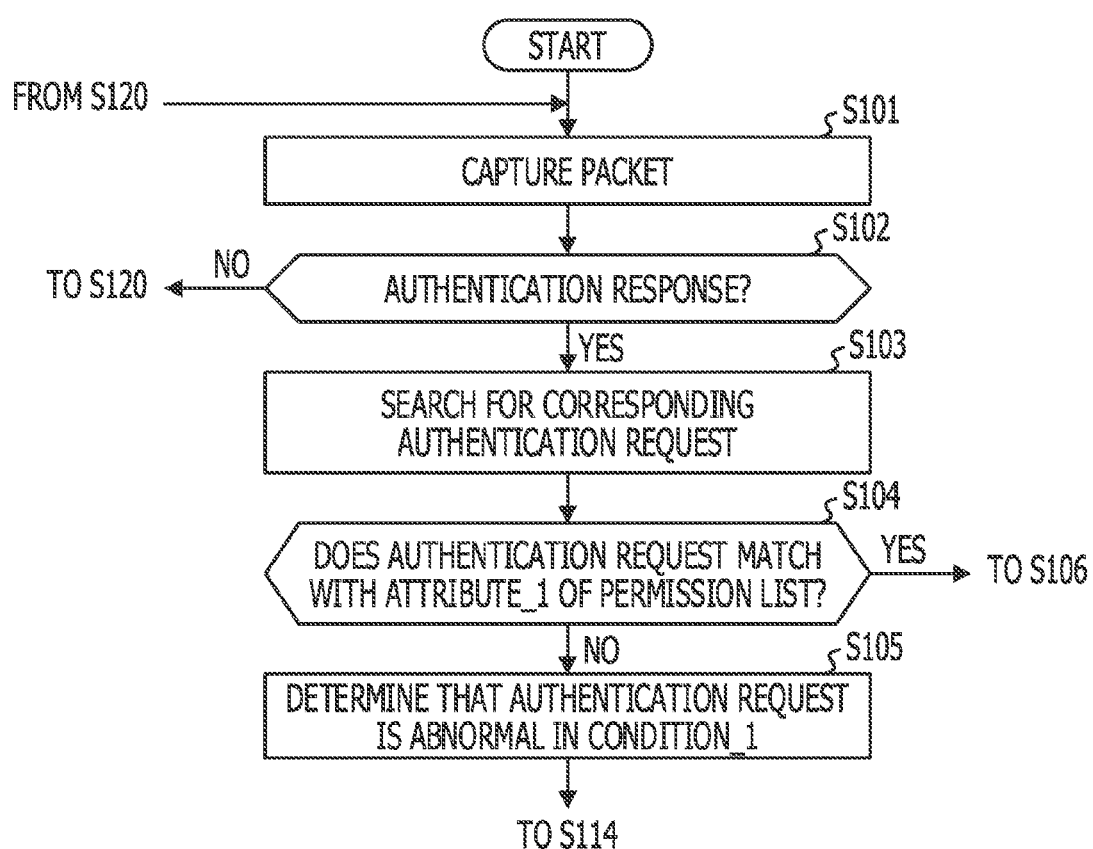
FIG. 13 is a flowchart illustrating a procedure of a monitoring process according to a second embodiment.

Next, the flow of a monitoring process according to the second embodiment will be described with reference to FIGS. 13 to 15. FIG. 13 is a first flowchart illustrating the procedure of the monitoring process according to the second embodiment.

S101: The capture unit 111 captures a packet transferred through the network 94. The capture unit 111 then adds a reception time (timestamp) to the captured packet, and stores the packet in the captured data storage unit 112.

S102: The authentication request monitoring section 131 determines whether or not the packet stored in the captured data storage unit 112 is an authentication response. For example, whether or not the packet is an authentication response may be determined by checking a source port number and the content (a user name, a result of authentication, and the like) of an SMB header included in the packet. If the packet is an authentication response, the process proceeds to S103. If the packet is not an authentication response, the process proceeds to S120 illustrated in FIG. 15.

S103: The authentication request monitoring section 131 searches the packets stored in the captured data storage unit 112 for an authentication request corresponding to the packet determined to be an authentication response in S102. For example, by referring to the IP addresses and the port numbers of sources and destinations included in the packets, an authentication request corresponding to the authentication response may be searched for.

S104: The authentication request monitoring section 131 determines whether or not the authentication request detected in the search process in S103 matches with Attribute_1 of the authentication permission list stored in the permission list storage unit 114. For example, when Attribute_1 is the IP address of an access apparatus (apparatus to be authenticated) (refer to the example illustrated in FIG. 10), the authentication request monitoring section 131 determines whether or not the source IP address included in the authentication request is included in Attribute_1 of the authentication permission list. Here, Attribute_1 corresponding to a row in which the IP address of an authentication apparatus (apparatus that performs authentication) and the destination IP address included in the packet regarding the authentication request match and the source IP address of the authentication request are compared. If the authentication request matches with Attribute_1 of the authentication permission list, the process proceeds to S106 illustrated in FIG. 14. If the authentication request does not match with Attribute_1 of the authentication permission list, the process proceeds to S105.

S105: The individual determination unit 113 determines that the authentication request is abnormal in Condition_1, which is satisfied when the authentication request does not match with Attribute_1 of the authentication permission list. When the process in S105 has been completed, the process proceeds to S114 illustrated in FIG. 15.

Figure 14:
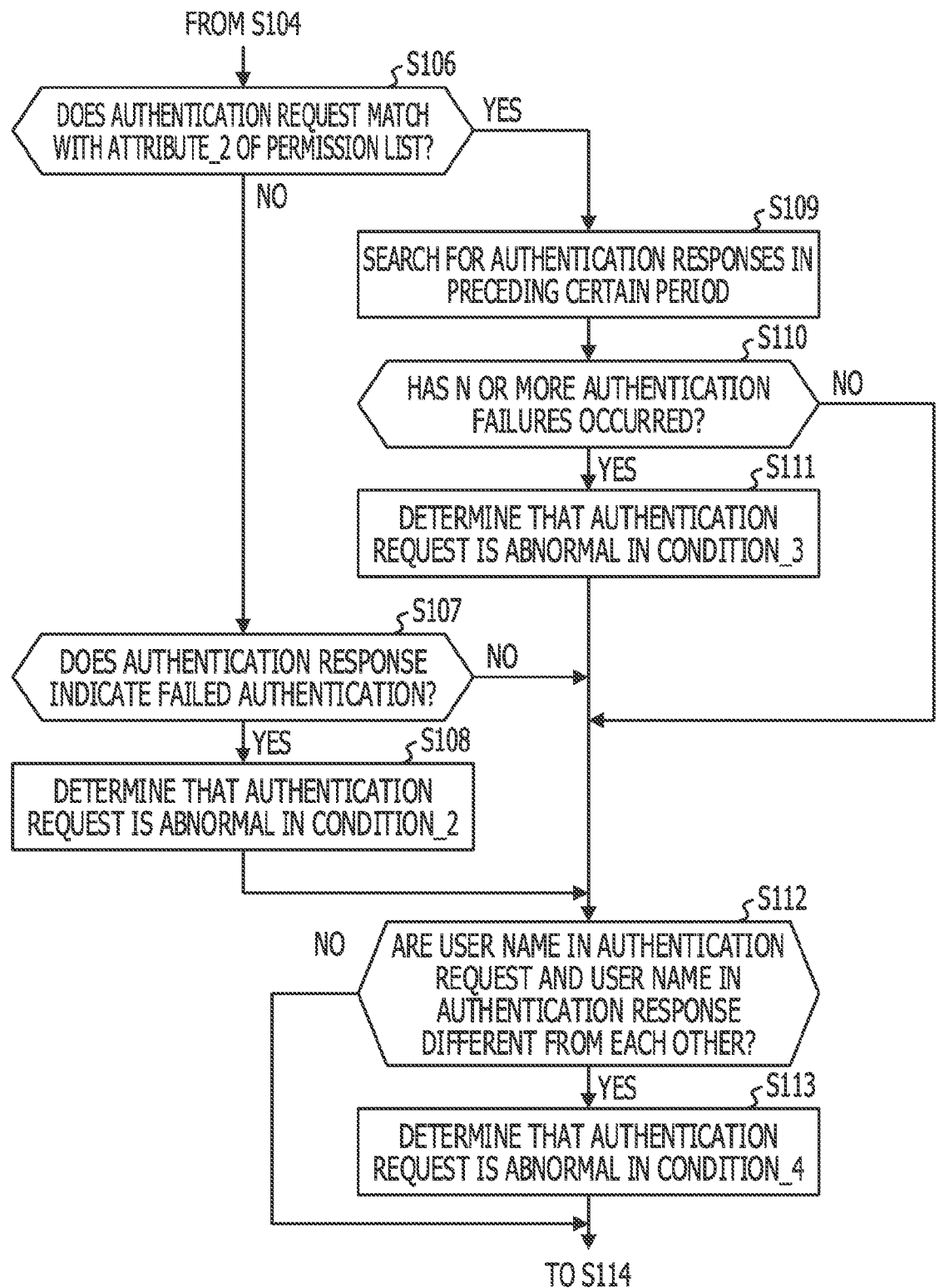
FIG. 14 is a flowchart illustrating a procedure of a monitoring process according to a second embodiment.

FIG. 14 is a second flowchart illustrating the procedure of the monitoring process according to the second embodiment.

S106: The authentication request monitoring section 131 determines whether or not the authentication request matches with Attribute_2 of the authentication permission list. For example, when Attribute_2 is a domain name (refer to the example illustrated in FIG. 10), the authentication request monitoring section 131 determines whether or not the domain name included in the authentication request is included in Attribute_2 of the authentication permission list. Here, Attribute_2 corresponding to a row in which the IP address of an authentication apparatus (apparatus that performs authentication) and the destination IP address included in the packet regarding the authentication request match and the domain name of the authentication request are compared. If the authentication request matches with Attribute_2 of the authentication permission list, the process proceeds to S109. If the authentication request does not match with Attribute_2 of the authentication permission list, the process proceeds to S107.

S107: The authentication result monitoring section 132 determines whether or not the authentication response indicates failed authentication. For example, by referring to a result of authentication included in the SMB header of the authentication response, whether or not the authentication response indicates failed authentication may be determined. For example, when the user name is correct but the password is incorrect, an authentication response whose SMB header includes a result of authentication indicating failed authentication is transmitted from the authentication apparatus to the access apparatus. If the authentication response indicates failed authentication, the process proceeds to S108. If the authentication response does not indicate failed authentication, the process proceeds to S112.

S108: The individual determination unit 113 determines that the authentication request is abnormal in Condition_2, which is satisfied when the authentication request does not match with Attribute_2 of the authentication permission list. When the process in S108 has been completed, the process proceeds to S112.

S109: The authentication request monitoring section 131 searches the packets stored in the captured data storage unit 112 for authentication responses that have been received in a certain period preceding the current time and whose source and destination IP addresses are the same as those of the authentication response in question. Since the packets stored in the captured data storage unit 112 are provided with timestamps indicating reception times, the authentication responses received in the certain period preceding the current time may be searched for by referring to the timestamps.

S110: The authentication result monitoring section 132 refers to the authentication responses detected in the search process in S109 and the authentication response captured in the processing in S101, and determines whether or not N or more authentication failures have occurred. For example, the authentication result monitoring section 132 refers to results of authentication included in the SMB headers of the authentication responses detected in the search process in S109 and the authentication response captured in S101, and counts the number of authentication responses including a result of authentication indicating failed authentication. The authentication result monitoring section 132 then determines whether or not the number of authentication responses counted is equal to or larger than N. The threshold N is an integer equal to or larger than 2, and determined by the administrator of the information processing system 100 in advance. If N or more authentication failures have occurred, the process proceeds to S111. If N or more authentication failures have not occurred, the process proceeds to S112. However, if the result of authentication included in the latest authentication response captured in S101 does not indicate failed authentication, the process may proceed to S112.

S111: The individual determination unit 113 determines that the authentication request is abnormal in Condition_3, which is satisfied when the number of authentication failures occurred in the certain period is equal to or larger than N. When the process in S111 has been completed, the process proceeds to S112.

S112: The user name monitoring section 133 determines whether or not a user name in the authentication request and a user name in the authentication response are different from each other. By referring to the SMB header of the authentication request and the SMB header of the authentication response, whether or not the user name in the authentication request and the user name in the authentication response are different from each other may be determined. If the user name in the authentication request and the user name in the authentication response are different from each other, the process proceeds to S113. If the user name in the authentication request and the user name in the authentication response are the same, the process proceeds to S114 illustrated in FIG. 15.

S113: The individual determination unit 113 determines that the authentication is abnormal in Condition_4, which is satisfied when the user name at the time of the authentication request and the user name at the time of the authentication response are different from each other. When the process in S113 has been completed, the process proceeds to S114 illustrated in FIG. 15.

Figure 15:
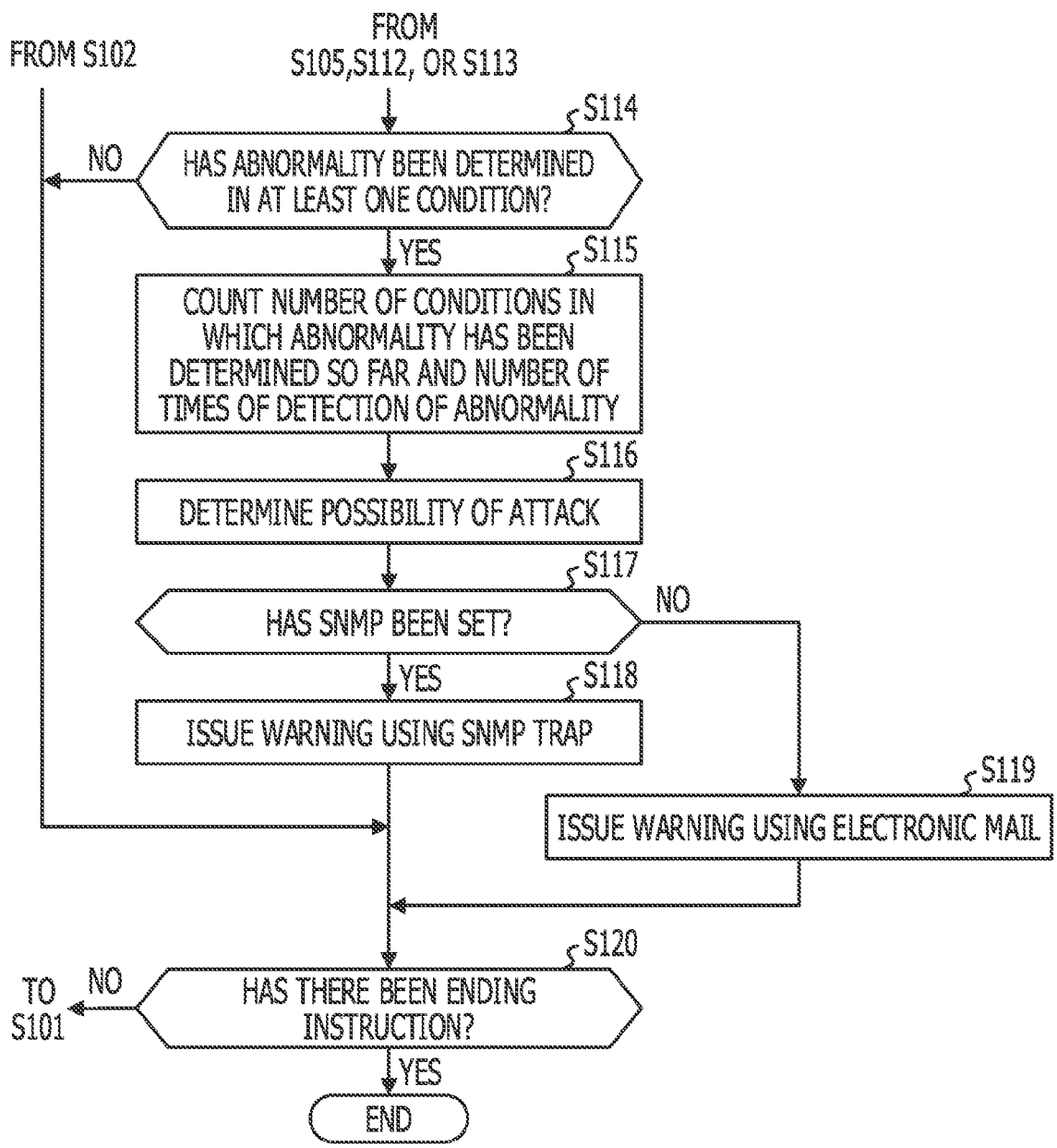
FIG. 15 is a flowchart illustrating a procedure of a monitoring process according to a second embodiment.

FIG. 15 is a third flowchart illustrating the procedure of the monitoring process according to the second embodiment.

S114: The comprehensive determination unit 115 determines whether or not abnormality has been determined in at least one of Condition_1 to Condition_4 this time. For example, if a result of a determination or notification regarding a determination that abnormality has been determined in one of the conditions is transmitted to the comprehensive determination unit 115 when the individual determination unit 113 has determined that abnormality has been determined in the one of the conditions, the comprehensive determination unit 115 may identify the number of conditions in which abnormality has been determined. If there is at least one condition in which abnormality has been determined, the process proceeds to S115. If there is no condition in which abnormality has been determined, the process proceeds to S120.

S115: The comprehensive determination unit 115 counts the number of conditions in which abnormality has been determined so far and the number of times of detection of abnormality in each condition. For example, the comprehensive determination unit 115 counts the number of times that abnormality has been determined in Condition_1, the number of times that abnormality has been determined in Condition_2, the number of times that abnormality has been determined in Condition_3, and the number of times that abnormality has been determined in Condition_4. Furthermore, the comprehensive determination unit 115 calculates the sum of the numbers of times that abnormality has been determined in Condition_1 to Condition_4.

S116: The comprehensive determination unit 115 determines the possibility of an attack on the basis of a result of the counting obtained in the processing in S115. At this time, the comprehensive determination unit 115 refers to the behavior table illustrated in FIG. 11. In the behavior table, Condition_1 to Condition_4 are assigned to the combinations between an authentication apparatus, an access apparatus, and a domain name. The comprehensive determination unit 115 refers to conditions described in the behavior table applied to the actual combination, and determines whether or not the actual combination corresponds to conditions described as "abnormal" in the behavior table. If there are a large number of "abnormal" conditions, the comprehensive determination unit 115 determines that there is likely to be an attack. If there are a small number of "abnormal" conditions, there is unlikely to be an attack.

For example, the comprehensive determination unit 115 determines the possibility of an attack to be "low" when the number of "abnormal" conditions is 0, "medium" when the number of "abnormal" conditions is 1, and "high" when the number of "abnormal" conditions is 2. When the authentication apparatus is the domain management server S1 and the access apparatus is the client C1, and when abnormality has been determined in Condition_3 and Condition_4, the comprehensive determination unit 115 determines the possibility of an attack to be "high" since abnormality has been determined in the two conditions described in the behavior table. When the authentication apparatus is the file server S3 and the access apparatus is the client C3, and when the Condition_3 has been determined to be abnormal, the comprehensive determination unit 115 determines the possibility of an attack to be "medium" since abnormality has been determined in only one condition described in the behavior table.

As a method for counting the number of "abnormal" conditions, as described above, a method for counting the number of conditions in which abnormality has been determined through one or a plurality of procedures for receiving authentication performed between an access apparatus and an authentication apparatus may be used. As another method, for example, a method for counting the number of conditions in which abnormality has been determined through one or a plurality of procedures for receiving authentication corresponding to a row (a combination of an authentication apparatus, the type of Attribute_1, and the type of Attribute_2) of the behavior table may be used. As a yet another method, for example, a method for counting the number of conditions in which abnormality has been determined through one or a plurality of procedures for receiving authentication corresponding to a combination of a group of authentication apparatuses in a domain, the type of Attribute_1, and the type of Attribute_2 may be used.

In addition to methods in which the number of "abnormal" conditions is used as it is, for example, a method may be used in which a weight is set for each condition and the sum of the weights of "abnormal" conditions is used as a score indicating the possibility of an attack. In this case, a threshold determination using two or more thresholds is made for the score in order to determine one of three or more warning levels.

Furthermore, a method may be used in which the sum of the numbers of times that abnormality has been determined in Condition_1 to Condition_4 is used as a score and a threshold determination using two or more thresholds is made for the score in order to determine one of three or more warning levels. As a method for calculating a score, for example, a method may be used in which the number of "abnormal" conditions and the number of times that abnormality has been determined in each condition are substituted for a certain function.

As a method for counting the number of times that abnormality has been determined in Condition_1 to Condition_4, for example, a method for counting the number of times that abnormality has been determined in Condition_1 to Condition_4 by monitoring procedures for receiving authentication performed between an access apparatus and an authentication apparatus may be used. As another method, for example, a method for counting the number of times that abnormality has been determined in Condition_1 to Condition_4 by monitoring procedures for receiving authentication corresponding to a row (a combination of an authentication apparatus, the type of Attribute_1, and the type of Attribute_2) of the behavior table may be used. As yet another method, for example, a method for counting the number of times that abnormality has been determined in Condition_1 to Condition_4 by monitoring procedures for receiving authentication corresponding to a combination of a group of authentication apparatuses in a domain, the type of Attribute_1, and the type of Attribute_2 may be used.

After determining the possibility of an attack as described above, the comprehensive determination unit 115 stores, in the warning data storage unit 117, warning data including information regarding an authentication apparatus and an access apparatus, a domain name, details of detection of abnormality, and information regarding a warning level indicating the possibility of an attack.

S117: The warning unit 118 determines whether or not SNMP has been set to the network monitoring apparatus 110. If SNMP has been set to the network monitoring apparatus 110, the process proceeds to S118. If SNMP has not been set to the network monitoring apparatus 110, the process proceeds to S119.

S118: The warning unit 118 transmits the warning data stored in the warning data storage unit 117 to the terminal apparatus 101 using an SNMP trap. When the processing in S118 has been completed, the process proceeds to S120.

S119: The warning unit 118 transmits the warning data stored in the warning data storage unit 117 to the terminal apparatus 101 using an electronic mail. When the processing in S119 has been completed, the process proceeds to S120.

S120: The network monitoring apparatus 110 determines whether or not there has been an instruction to end the process. If there has been an instruction to end the process, the process illustrated in FIGS. 13 to 15 ends. If there has not been an instruction to end the process, the process proceeds to S101 illustrated in FIG. 13.

The procedure of the monitoring process according to the second embodiment has been described.

As described above, according to the second embodiment, the possibility of unauthorized access is determined in accordance with the number of "abnormal" conditions among a plurality of conditions. Therefore, compared to when only one fixed condition is set and it is determined that unauthorized access has been performed if access satisfies the condition and it is determined that unauthorized access has not been performed if access does not satisfy the condition, useful information that takes into consideration erroneous detection may be provided. In particular, by representing the possibility of unauthorized access as one of a plurality of warning levels, it becomes easier for the system administrator to take appropriate measures. Thus, according to the second embodiment, it is possible to provide useful information regarding unauthorized access, which is not easy to accurately distinguish from normal access.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for detecting unauthorized access, the method being executed by a network monitoring apparatus connected to a network in which packets are transmitted between a plurality of information processing apparatuses, the method comprising:

obtaining, by the network monitoring apparatus, packets regarding at least one access performed from a first information processing apparatus to a second information processing apparatus;

selecting a first condition from among predefined at least two conditions, the selection being performed according to a combination between the first information processing apparatus as an access source and the second information processing apparatus as an access destination;

determining whether each of the obtained packets satisfies the selected first condition;

repeating the selecting and determining for each of the conditions from among predefined at least two conditions other than the first condition regardless of whether or not each of the obtained packets satisfies the selected first condition;

determining a level of unauthorized access that has been performed on the second information processing apparatus by the first information processing apparatus, the level of unauthorized access being based on a number of conditions determined to be satisfied among the predefined at least two conditions.

2. The method according to claim 1, wherein
the obtained packets include at least one of
a packet regarding an authentication request for requesting authentication and
a packet regarding an authentication response transmitted in response to the authentication request,
wherein the authentication request has been transmitted from the first information processing apparatus to the second information processing apparatus,
wherein the authentication response has been transmitted from the second information processing apparatus to the first information processing apparatus.

3. The method according to claim 2, wherein
one of the predefined at least two conditions is that user information included in the authentication request and user information included in the authentication response corresponding to the authentication request are different from each other.

4. The method according to claim 2, wherein
the predefined at least two conditions include a first condition and a second condition, the first condition and the second condition being selected exclusively,
the first condition is that N or more authentication responses indicating failed authentication have been transmitted, N being an integer equal to or larger than 2, and
the second condition is that M or more authentication responses indicating failed authentication have been transmitted, M being an integer equal to or larger than 1 and smaller than N.

5. The method according to claim 1, wherein
one of the predefined at least two conditions is that the combination is not registered as permitted access or is registered as forbidden access.

6. The method according to claim 1, further comprising:
outputting, as information indicating the possibility, information indicating a warning level selected from a plurality of warning levels.

7. A network monitoring apparatus connected to a network in which packets are transmitted between a plurality of information processing apparatuses, the network monitoring apparatus comprising:
an electronic device configured to obtain packets regarding at least one access performed from a first information processing apparatus to a second information processing apparatus, select a first condition from among predefined at least two conditions, the selection being performed according to a combination between the first information processing apparatus as an access source and the second information processing apparatus as an access destination, determine whether each of the obtained packets satisfies the selected first condition, repeat the selecting and determining for each of the conditions from among predefined at least two conditions other than the first condition regardless of whether or not each of the obtained packets satisfies the selected first condition, and determine a level of unauthorized access that has been performed on the second information processing apparatus by the first information processing apparatus, the level of unauthorized access being based on a number of conditions determined to be satisfied among the predefined at least two conditions.

8. A non-transitory computer-readable recording medium storing a program that causes a computer to execute a process, the computer being connected to a network in which packets are transmitted between a plurality of information processing apparatuses, the process comprising:

obtaining packets regarding at least one access performed from a first information processing apparatus to a second information processing apparatus;

selecting a first condition from among predefined at least two conditions, the selection being performed according to a combination between the first information processing apparatus as an access source and the second information processing apparatus as an access destination;

determining whether each of the obtained packets satisfies the selected first condition;

repeating the selecting and determining for each of the conditions from among predefined at least two conditions other than the first condition regardless of whether or not each of the obtained packets satisfies the selected first condition;

determining a possibility that unauthorized access has been performed on the second information processing apparatus by the first information processing apparatus, a level of unauthorized access being based on a number of conditions determined to be satisfied among the predefined at least two conditions.

* * * * *